United States Patent
Guo et al.

(10) Patent No.: US 10,469,618 B2
(45) Date of Patent: Nov. 5, 2019

(54) ADAPTIVE SCALING OF A SERVICE PROVIDED FOR A PLURALITY OF TERMINAL DEVICES

(71) Applicant: FUJITSU LIMITED, Kawasaki-shi, Kanagawa (JP)

(72) Inventors: Zhaogong Guo, Koto (JP); Junichi Yura, Kawasaki (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 143 days.

(21) Appl. No.: 15/886,460

(22) Filed: Feb. 1, 2018

(65) Prior Publication Data
US 2018/0227389 A1 Aug. 9, 2018

(30) Foreign Application Priority Data
Feb. 8, 2017 (JP) .................................. 2017-021595

(51) Int. Cl.
| G06F 15/173 | (2006.01) |
| H04L 29/08 | (2006.01) |
| G06F 9/50 | (2006.01) |
| H04W 4/12 | (2009.01) |
| H04L 29/06 | (2006.01) |

(52) U.S. Cl.
CPC ............ *H04L 67/325* (2013.01); *G06F 9/505* (2013.01); *H04L 67/10* (2013.01); *H04L 67/42* (2013.01); *H04W 4/12* (2013.01)

(58) Field of Classification Search
CPC . H04L 67/1002; H04L 65/1069; H04L 67/16; H04L 63/08; H04L 63/083; H04L 63/102; H04L 67/12
USPC ........................................ 709/224, 223, 202
See application file for complete search history.

(56) References Cited

U.S. PATENT DOCUMENTS
2015/0215426 A1 7/2015 Torii et al.

FOREIGN PATENT DOCUMENTS
| JP | 10-283209 | 10/1998 |
| JP | 2011-138202 | 7/2011 |
| JP | 2015-141574 | 8/2015 |

*Primary Examiner* — Lan Dai T Truong
(74) *Attorney, Agent, or Firm* — Fujitsu Patent Center

(57) ABSTRACT

An apparatus provides a service to a plurality of terminal devices. The apparatus receives, from each of one or more terminal devices among the plurality of terminal devices, a first notification indicating a predetermined operation timing before the service is used in each terminal device. The apparatus performs scaling of the service, based on the first notifications received from the one or more terminal devices.

15 Claims, 38 Drawing Sheets

| APPLICATION NAME | SERVICE IDENTIFIER |
|---|---|
| APP1 | S-1 |
| APP2 | S-2 |
| ⋮ | ⋮ |

FIG. 10

| SERVICE IDENTIFIER | NUMBER OF TERMINAL DEVICES | NUMBER OF MOST RECENT ACCESSES | NUMBER OF INSTANCES: 1 | | NUMBER OF INSTANCES: 2 | | NUMBER OF INSTANCES: 3 | | ... |
|---|---|---|---|---|---|---|---|---|---|
| | | | LOWER LIMIT VALUE | UPPER LIMIT VALUE | LOWER LIMIT VALUE | UPPER LIMIT VALUE | LOWER LIMIT VALUE | UPPER LIMIT VALUE | |
| S-1 | 10 | 10 | 0 | 20 | 20 | 40 | 40 | 60 | ... |
| S-2 | 20 | 20 | 0 | 20 | 20 | 40 | 40 | 60 | ... |
| ... | ... | ... | ... | ... | ... | ... | ... | ... | ... |

FIG. 11

| SERVICE IDENTIFIER | INTERFACE IDENTIFIER |
|---|---|
| S-1 | I-1 |
|  | I-2 |
|  | ⋮ |
| S-2 | I-3 |
|  | I-4 |
|  | ⋮ |
| ⋮ | ⋮ |

FIG. 14

| APPLICATION NAME | SERVICE IDENTIFIER | STATE |
|---|---|---|
| APP1 | S-1 | OPERATION |
| APP2 | S-2 | STOP |
| ⋮ | ⋮ | ⋮ |

FIG. 36

| SERVICE IDENTIFIER | NUMBER OF TERMINAL DEVICES | NUMBER OF MOST RECENT ACCESSES | FIRST RESOURCE AMOUNT | | SECOND RESOURCE AMOUNT | | THIRD RESOURCE AMOUNT | | |
|---|---|---|---|---|---|---|---|---|---|
| | | | LOWER LIMIT VALUE | UPPER LIMIT VALUE | LOWER LIMIT VALUE | UPPER LIMIT VALUE | LOWER LIMIT VALUE | UPPER LIMIT VALUE | |
| S-1 | 10 | 10 | 0 | 20 | 20 | 40 | 40 | 60 | ... |
| S-2 | 20 | 20 | 0 | 20 | 20 | 40 | 40 | 60 | ... |
| ... | ... | ... | ... | ... | ... | ... | ... | ... | ... |

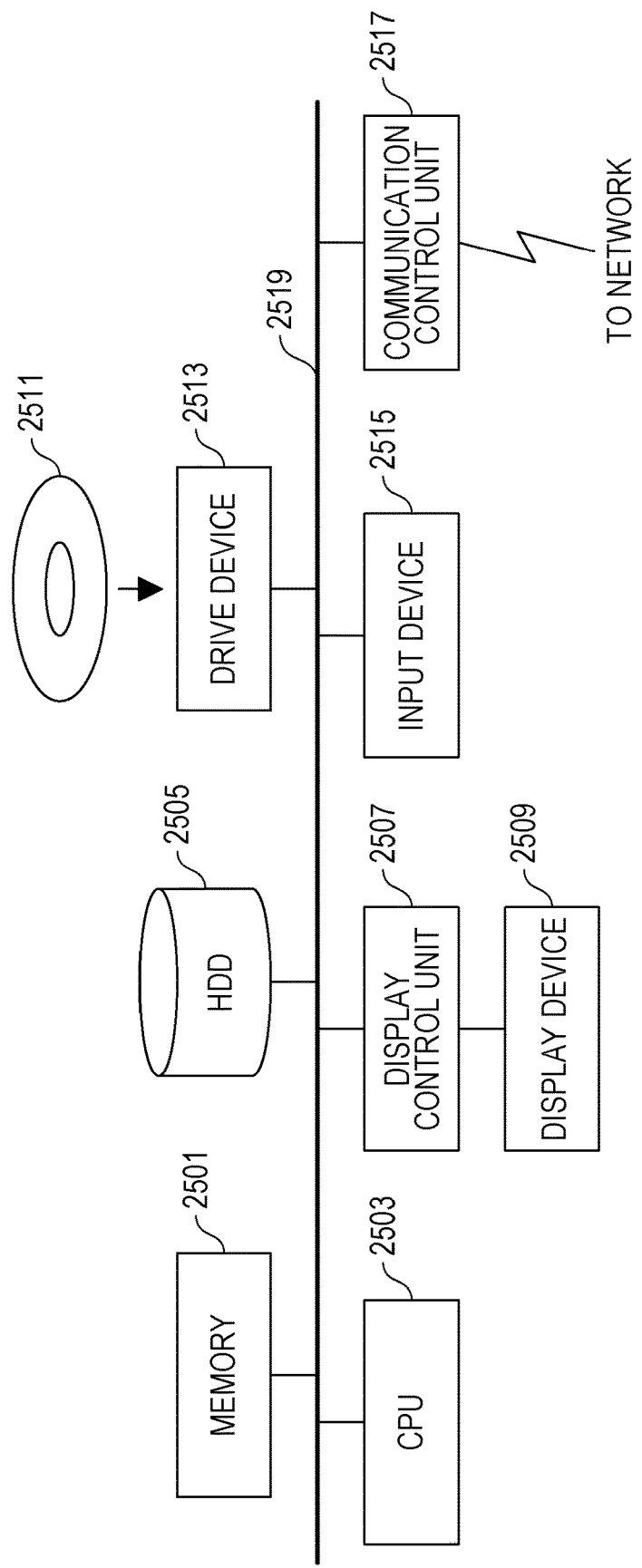

ADAPTIVE SCALING OF A SERVICE PROVIDED FOR A PLURALITY OF TERMINAL DEVICES

CROSS-REFERENCE TO RELATED APPLICATION

This application is based upon and claims the benefit of priority of the prior Japanese Patent Application No. 2017-21595, filed on Feb. 8, 2017, the entire contents of which are incorporated herein by reference.

FIELD

The embodiments discussed herein are related to adaptive scaling of a service provided for a plurality of terminal devices.

BACKGROUND

If an access from an application of a terminal device to a service of a server device is concentrated, response performance is degraded. In order to cope with this situation, there is, for example, a technology that increases an instance corresponding to a service by scale-out in accordance with an increase of the number of accesses from an application. According to the technology, the response performance may be recovered by distributing a load to each instance.

However, since it takes time to perform the scale-out, it is not possible to cope with, for example, concentration of a rapid access.

Japanese Laid-open Patent Publication No. 2015-141574, Japanese Laid-open Patent Publication No. 10-283209, and Japanese Laid-open Patent Publication No. 2011-138202 are examples of the related art.

SUMMARY

According to an aspect of the invention, an apparatus provides a service to a plurality of terminal devices. The apparatus receives, from each of one or more terminal devices among the plurality of terminal devices, a first notification indicating a predetermined operation timing before the service is used in each terminal device. The apparatus performs scaling of the service, based on the first notifications received from the one or more terminal devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram illustrating an example of a service table;

FIG. 11 is a diagram illustrating an example of a routing table;

FIG. 14 is a diagram illustrating an example of an application table according to Embodiment 2;

FIG. 36 is a diagram illustrating an example of a service table according to Embodiment 4;

FIG. 41 is an example of a hardware configuration of a computer.

DESCRIPTION OF EMBODIMENTS

As mentioned above, it is preferable to more appropriately cope with a variation of a load with respect to a service provided for terminal devices.

Embodiment 1

Figure 1:
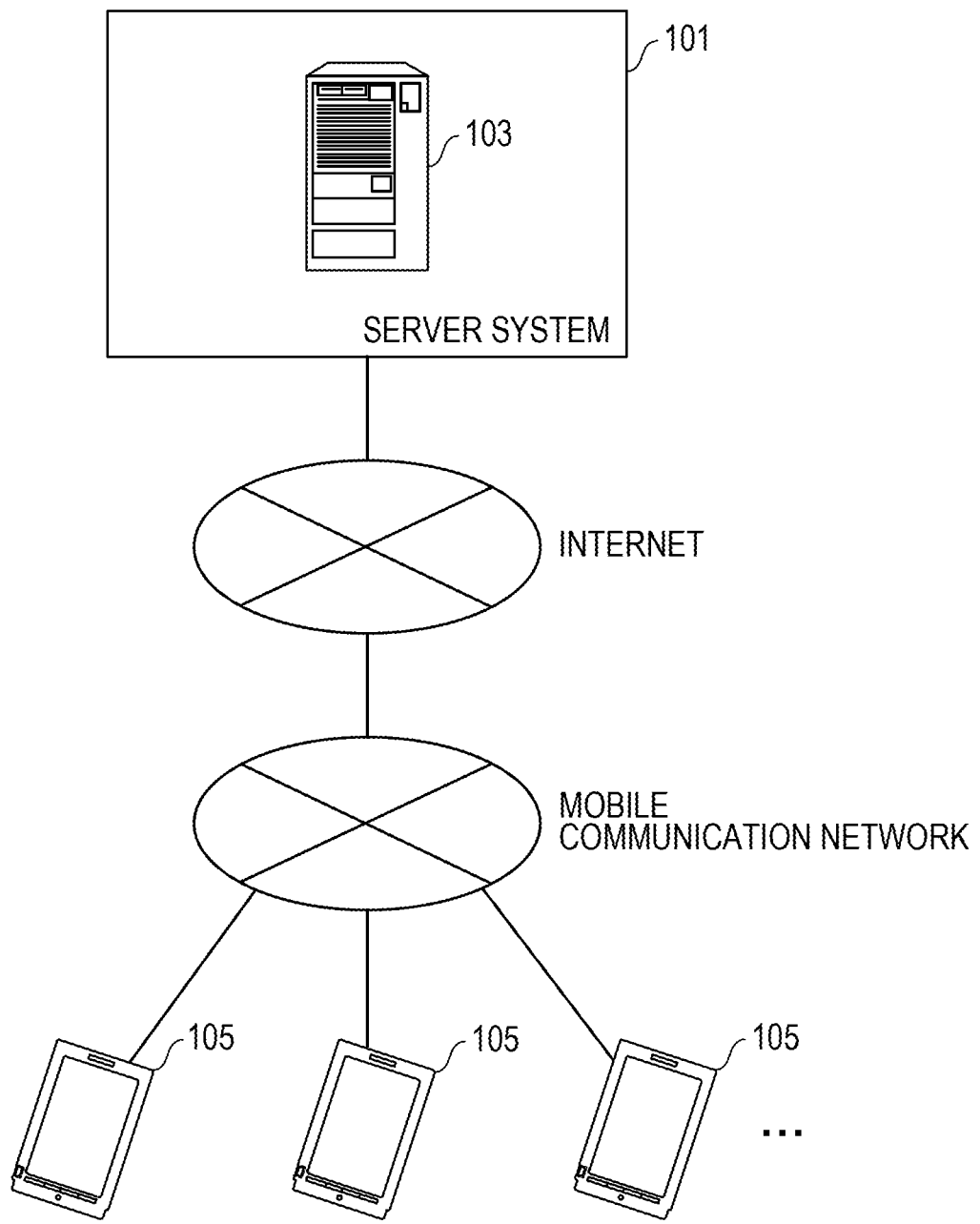
FIG. 1 is a diagram illustrating an example of a network configuration.

Four examples of a network configuration that is assumed are disclosed. The example of the network configuration illustrated in FIG. 1 will be described. A terminal device 105 in this example includes a wireless communication device (for example, a smartphone). The terminal device 105 is coupled to a server system 101 via a mobile communication network and the Internet. The server system 101 includes one or a plurality of server devices 103.

Figure 2:
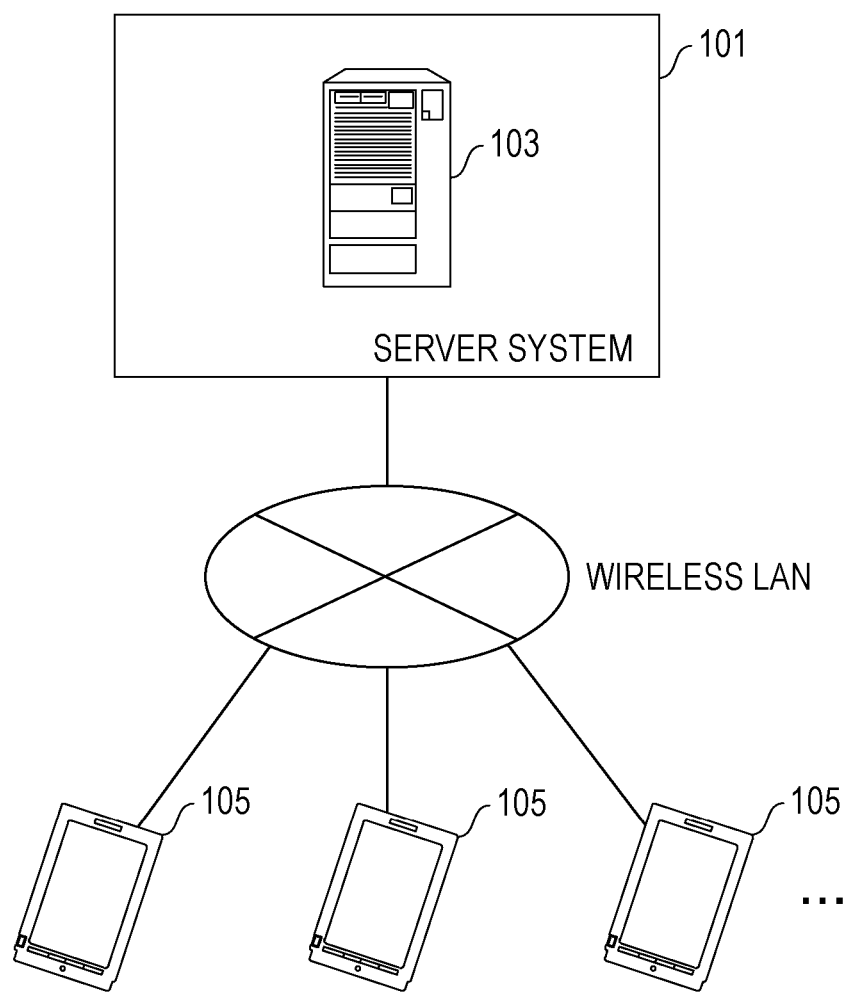
FIG. 2 is a diagram illustrating an example of the network configuration.

The example of the network configuration illustrated in FIG. 2 will be described. The terminal device 105 in this example also includes a wireless communication device. The terminal device 105 is coupled to the server system 101 via a wireless Local Area Network (LAN). In the same manner as in the case of FIG. 1, the server system 101 includes one or a plurality of server devices 103.

Figure 3:
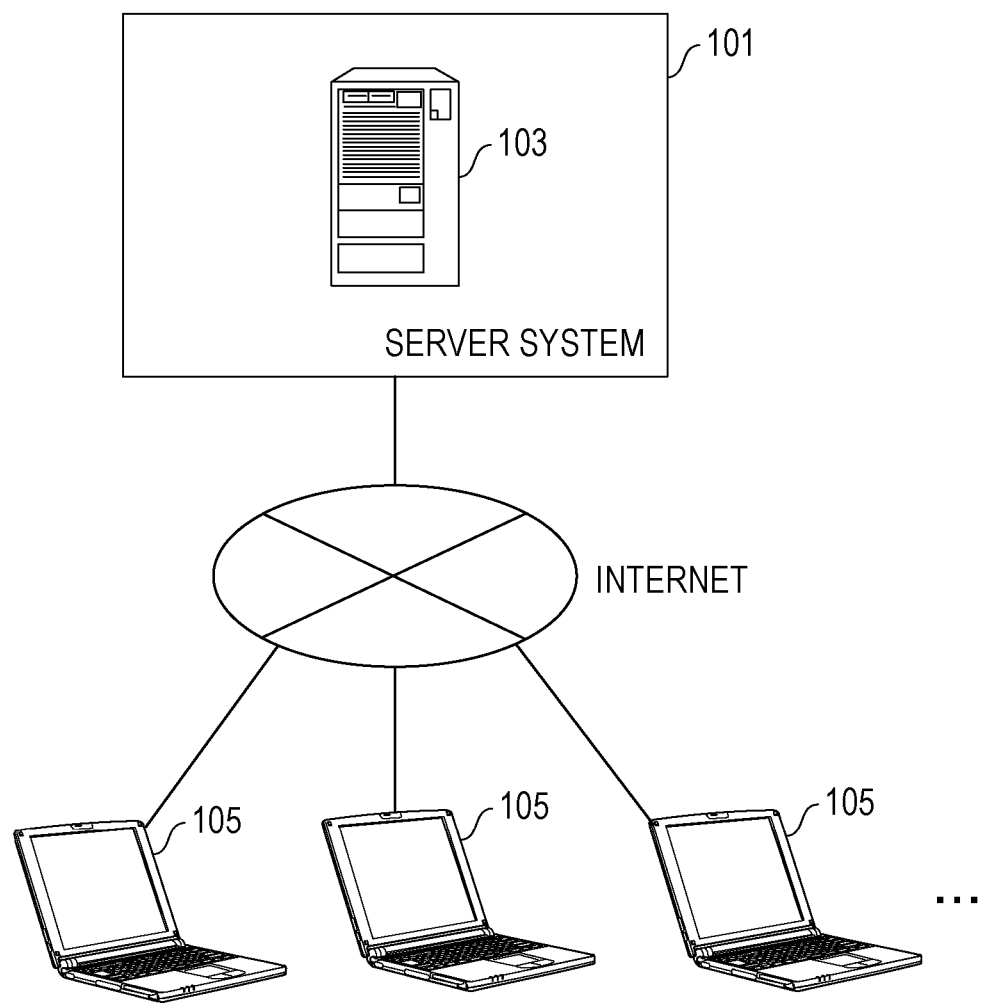
FIG. 3 is a diagram illustrating an example of the network configuration.

The example of the network configuration illustrated in FIG. 3 will be described. The terminal device 105 in this example is a device (for example, a personal computer) including a wire communication device. The terminal device 105 is coupled to the server system 101 via the Internet. In the same manner as in the case of FIG. 1, the server system 101 has one or a plurality of server devices 103.

Figure 4:
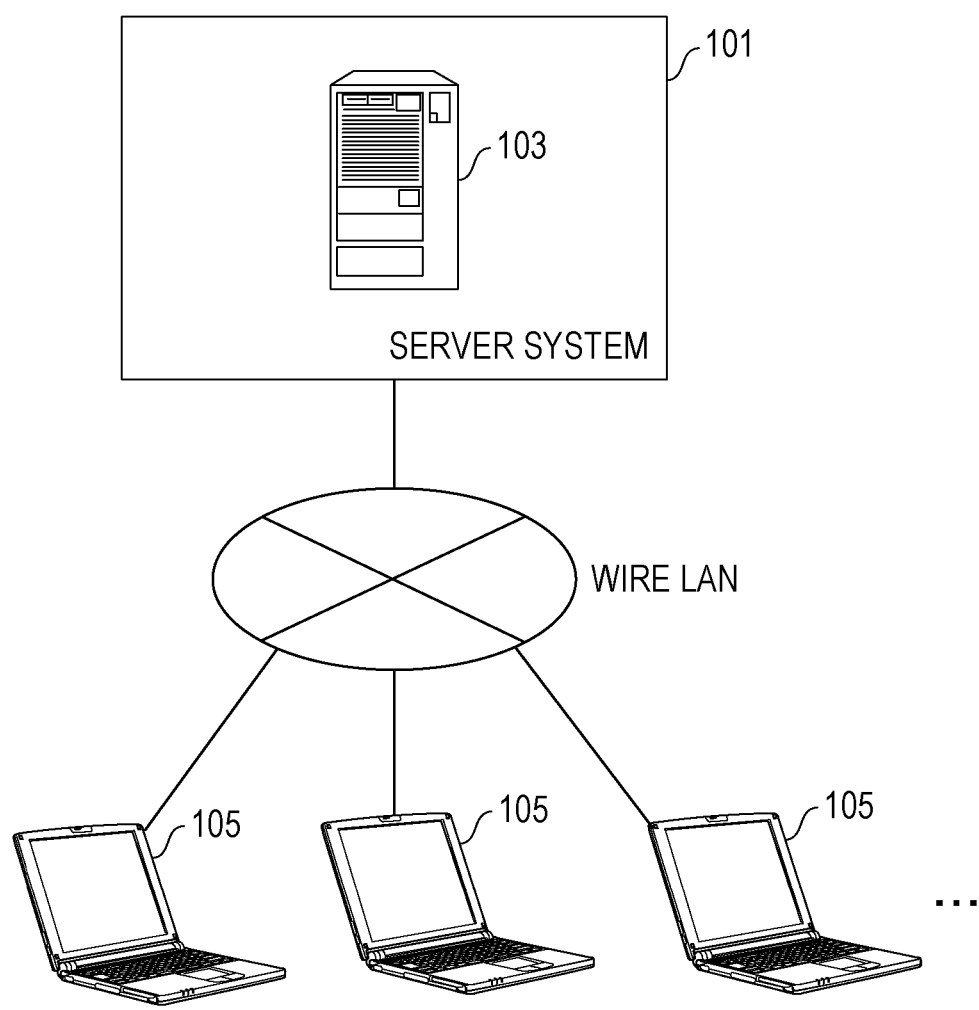
FIG. 4 is a diagram illustrating an example of the network configuration.

The example of the network configuration illustrated in FIG. 4 will be described. The terminal device 105 in this example also includes a wire communication device. The terminal device 105 is coupled to the server system 101 via a wire LAN. In the same manner as in the case of FIG. 1, the server system 101 includes one or a plurality of server devices 103.

In the embodiments, an example will be described in which whether to perform scale-out is determined based on the number of terminal devices 105 in which an application starts up.

Figures 5, 6:
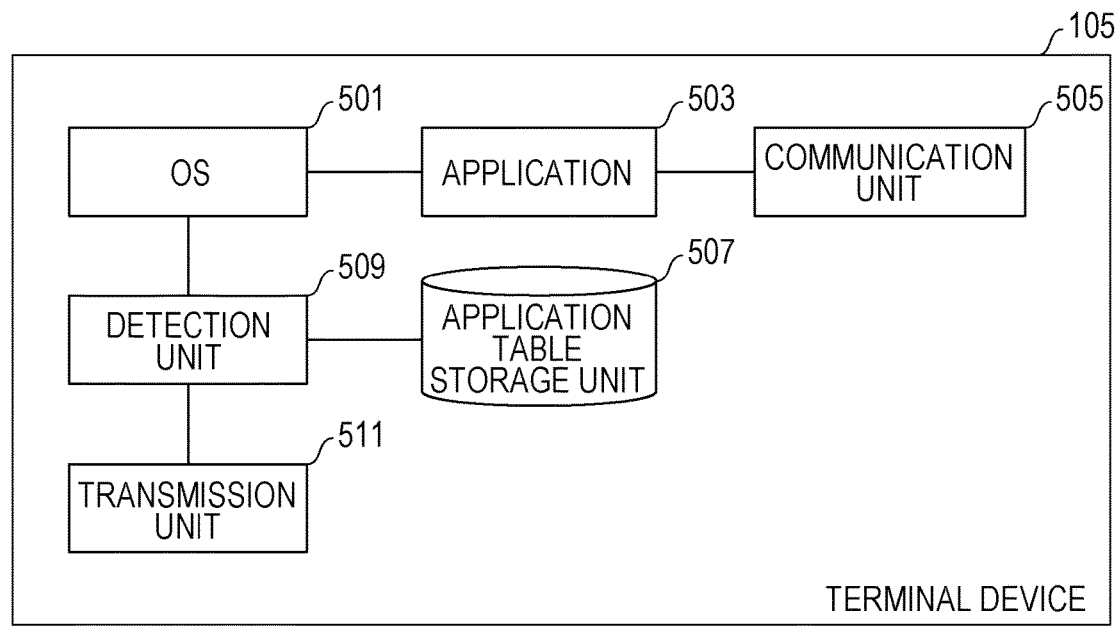
FIG. 5 is a diagram illustrating an example of a module configuration of a terminal device.
FIG. 6 is a diagram illustrating an example of an application table.

FIG. 5 illustrates an example of a module configuration of the terminal device 105. The terminal device 105 includes an operating system (OS) 501, an application 503, a communication unit 505, an application table storage unit 507, a detection unit 509, and a transmission unit 511.

The application 503 is a program that uses a service of the server system 101. The application 503 in this example operates in an environment of the OS 501. The application 503 transmits a request to the server system 101 via the communication unit 505 and receives a response from the server system 101 via the communication unit 505. The application table storage unit 507 stores an application table. The application table will be described below with reference to FIG. 6. The detection unit 509 detects, for example, start-up of the application 503. The transmission unit 511 transmits a notification to the server system 101. The transmission unit 511 may be a mobile management agent.

The communication unit 505, the detection unit 509, and the transmission unit 511 described above are realized by using a hardware resource (for example, FIG. 40 or 41) and a program that cause a processor to perform the processing which will be described below.

Figure 40:
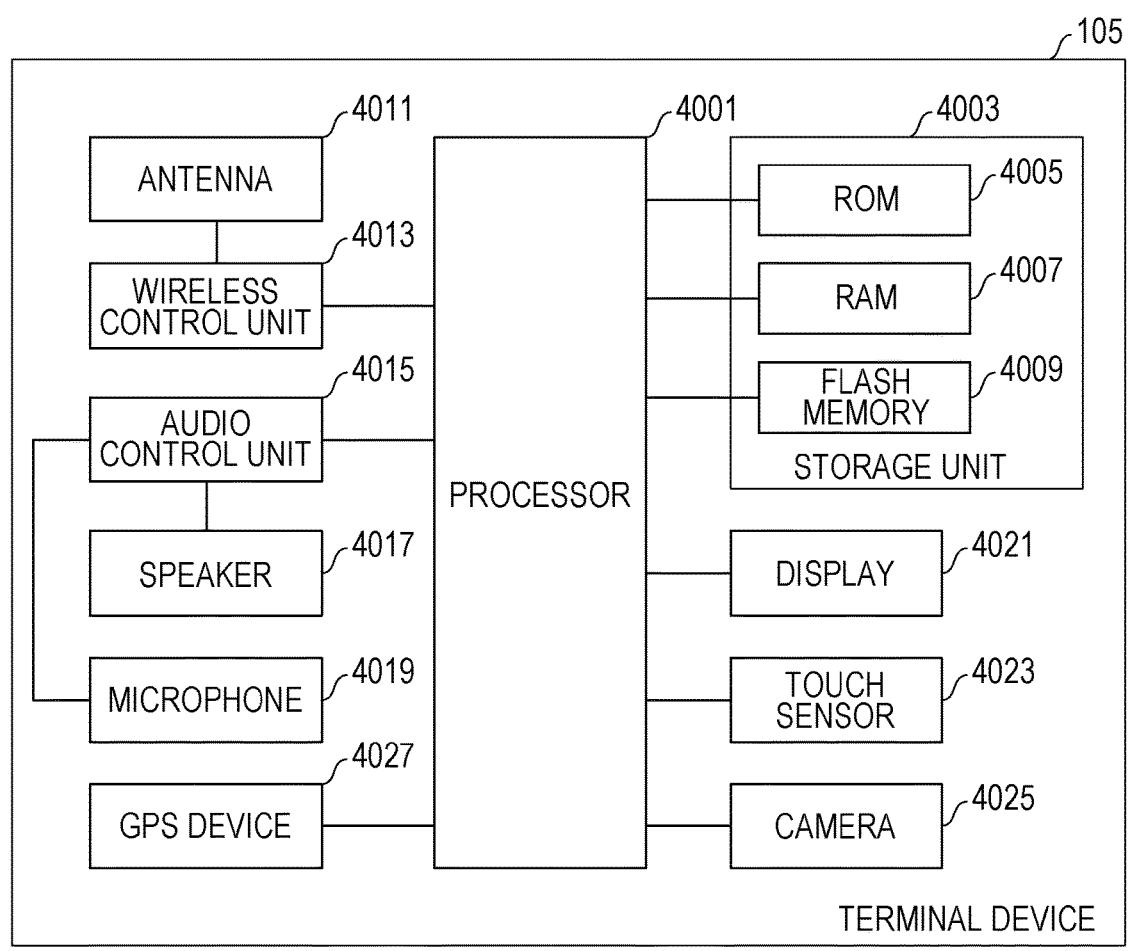
FIG. 40 is an example of a hardware configuration of a terminal device including a wireless communication device.

The application table storage unit 507 described above is realized by using the hardware resource (for example, FIG. 40 or 41).

An example of the application table is illustrated in FIG. 6. The application table in this example has a record (hereinafter, referred to as an application record) that corresponds to the application 503 which is previously installed. The application record includes a field in which application names are stored and a field in which service identifier is stored.

The application name is a name of the application 503. The service identifier identifies a service used by the application 503. The service identifier is, for example, the URL of the service, a name of the service, or a number assigned to the service. In a case where the application 503 uses a plurality of services, identifiers of the respective service are stored.

Figure 7:
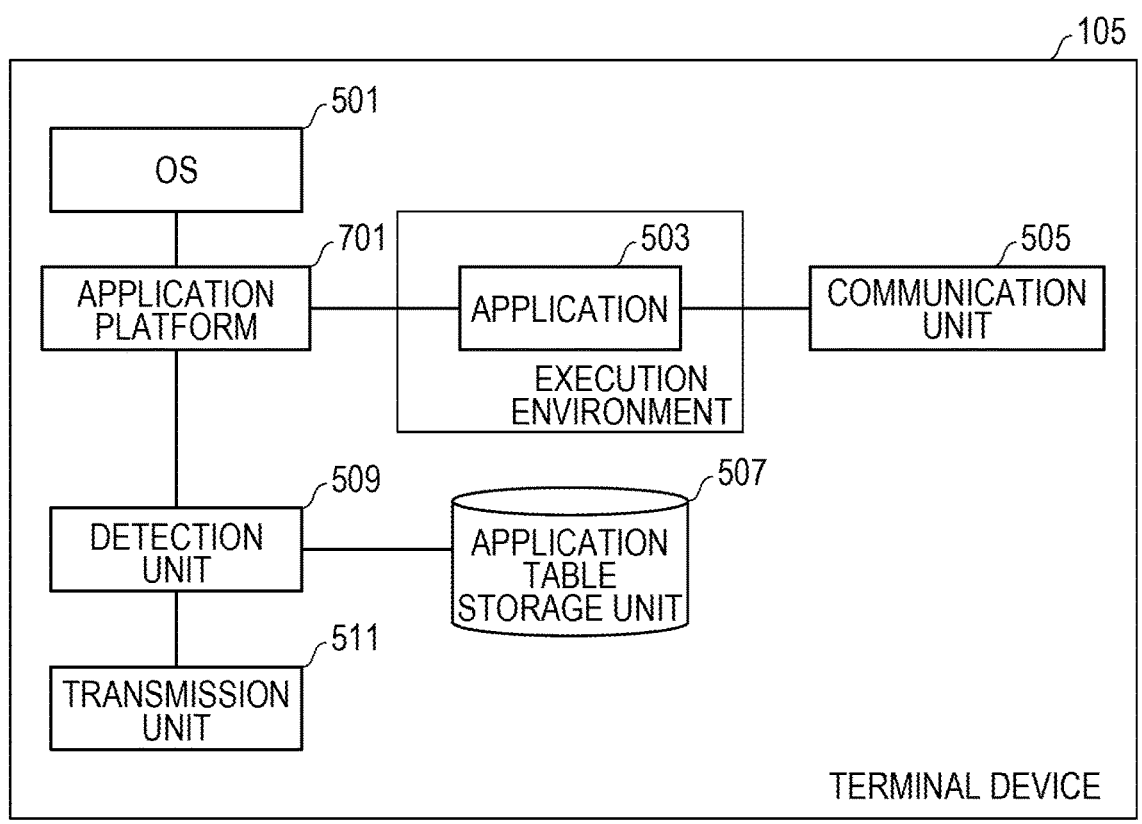
FIG. 7 is a diagram illustrating another example of the module configuration of the terminal device.

FIG. 7 illustrates another example of the module configuration of the terminal device 105. An application platform 701 provides an environment in which the application 503 is executed. That is, the application 503 operates in an execution environment provided by the application base 701. In such a configuration, the application 503 is executed independently of a type of the OS 501.

The application base 701 is realized by using a hardware resource (for example, FIG. 40 or 41) and a program that cause a processor to perform the processing which will be described below.

Figure 8:
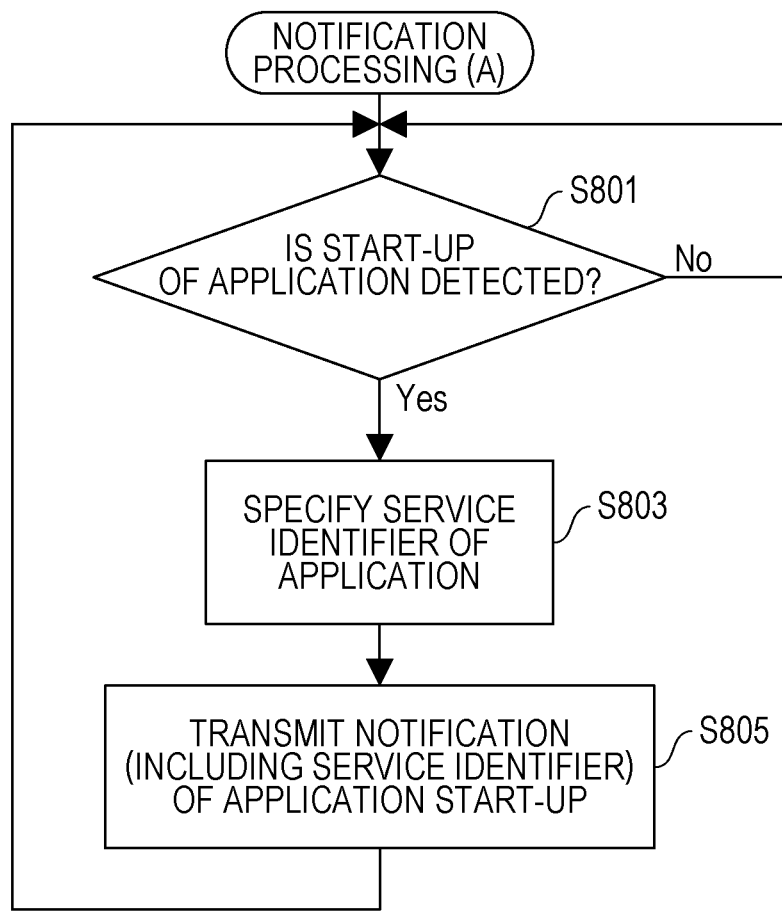
FIG. 8 is a diagram illustrating an example of a flowchart of notification processing (A)

Subsequently, notification processing (A) of the terminal device 105 will be described. In the embodiment, the notification processing (A) is performed. A flowchart of the notification processing (A) is illustrated in FIG. 8. The detection unit 509 determines whether or not start-up of the application 503 is detected (S801). For example, the detection unit 509 acquires a name of a process from the OS 501, and in a case where the name of the process in which a new operation starts coincides with a name of the application 503, the detection unit detects the start-up of the application 503. In a case where the detection unit determines that the start-up of the application 503 is not detected, the processing S801 is repeated.

Meanwhile, in a case where it is determined that the start-up of the application 503 is detected, the detection unit 509 specifies a service identifier corresponding to the started-up application 503, based on an application record (S803). Then, the transmission unit 511 transmits a notification (including the service identifier) of the application start-up to the server system 101 (S805). Then, the processing returns to the processing described in S801 and the above-described processing is repeated.

Figure 9:
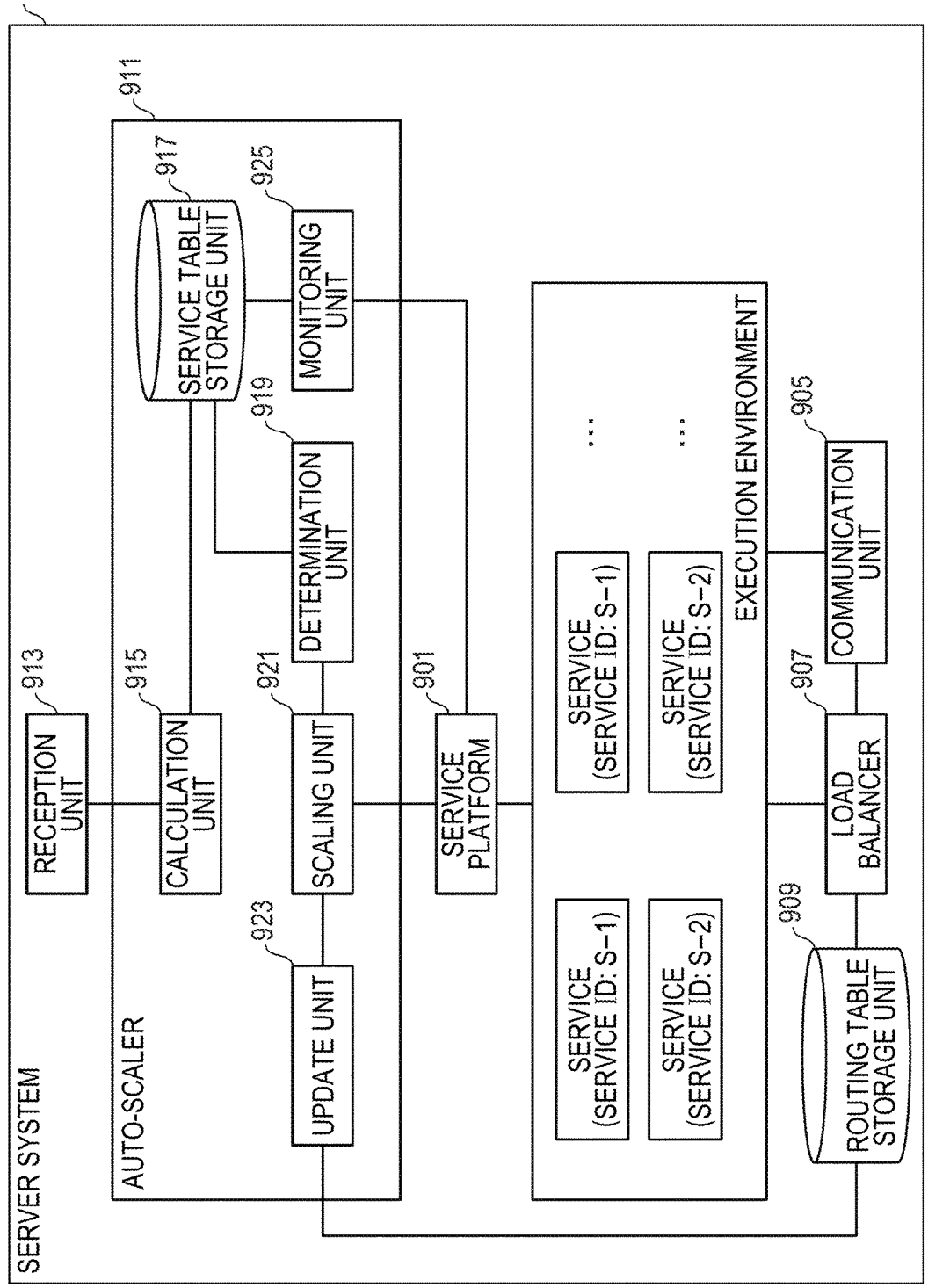
FIG. 9 is a diagram illustrating an example of a module configuration of a server system.

Subsequently, the server system 101 will be described. FIG. 9 illustrates an example of a module configuration of the server system 101. The server system 101 includes a service platform 901, a communication unit 905, a load balancer 907, a routing table storage unit 909, an auto-scaler 911, and a reception unit 913.

The service platform 901 provides an environment in which a service operates as an instance. The service platform 901 may be, for example, a platform as a service (PaaS) or a backend as a service (BaaS). One or a plurality of instances of the same service are provided in an execution environment of the service platform 901. Content of the service is not limited. The service may be a function of a Web server. The service may be a function of an application server. The service may be a function of a database server. The service may be a function of an application server and a function of the Web server. The service may be a function of an application server and a function of a database server. The service may be a function of the Web server, a function of an application server, and a function of a database server.

The communication unit 905 receives a request to the service and transmits a response from the service. The load balancer 907 distributes the request received by the communication unit 905 to instances of the service, based on a routing table. The routing table storage unit 909 stores the routing table. The routing table will be described with reference to FIG. 11. The auto-scaler 911 performs an automatic scaling. The reception unit 913 receives various types of notifications. The reception unit 913 may be a mobile management server.

The auto-scaler 911 includes a calculation unit 915, a service table storage unit 917, a determination unit 919, a scaling unit 921, an update unit 923, and a monitoring unit 925. The calculation unit 915 calculates the number of terminal devices 105 that reach a predetermined operation timing, or the number of the terminal devices 105 that perform a predetermined operation. The service table storage unit 917 stores a service table. The service table will be described below with reference to FIG. 10. The determination unit 919 determines whether to perform scaling. The scaling unit 921 performs scaling. The update unit 923 updates a routing table in accordance with the scaling. The monitoring unit 925 monitors an access to the service and calculates the number of most recent accesses. The number of most recent accesses is the number of accesses for a predetermined period of time, and is set in a service table.

The service platform 901, the communication unit 905, the load balancer 907, the auto-scaler 911, the reception unit 913, the calculation unit 915, the determination unit 919, the scaling unit 921, the update unit 923, and the monitoring unit 925 which are described above are realized by using the hardware resources (for example, FIG. 41) and a program that cause a processor to execute the processing which will be described below.

The routing table storage unit 909 and the service table storage unit 917 which are described above are realized by using the hardware resources (for example, FIG. 41).

An example of the service table is illustrated in FIG. 10. The service table of this example has a record (hereafter, referred to as a service record) corresponding to the service. The service record includes a field in which service identifiers are stored, a counter for the number of terminal devices, a counter for the number of most recent accesses, a field in which a lower limit value corresponding to the number of instances is stored, and a field in which an upper limit value corresponding to the number of instances is stored.

The service identifier is, for example, the URL of the service, a name of the service, or a number assigned to the service. The counter for the number of terminal devices stores the number of terminal devices 105 that are calculated in the main processing which will be described. The counter for the number of most recent accesses stores the number of accesses received in most recent period of time. In a case where the instance of the number of instances is provided, the lower limit value corresponding to the number of instances indicates a lower limit of an appropriate range of the number of accesses received within a predetermined time. In a case where the instance of the number of instances is provided, the upper limit value corresponding to the number of instances indicates an upper limit of an appropriate range of the number of accesses received within the predetermined time.

The modules may be included in one server device 103. Alternatively, the modules may be shared in a plurality of server devices 103. The service platform 901, an execution environment by the service platform 901, the communication unit 905, the load balancer 907, and the routing table storage unit 909 may be independently configured as a single server device 103. The auto-scaler 911 may be independently configured as a single server device 103. The reception unit 913 may be independently configured as a single server device 103. However, the sharing is arbitrarily performed.

An example of the routing table is illustrated in FIG. 11. The routing table in this example includes a record corresponding to the service. The record of the routing table includes a field in which the service identifiers are stored and a field in which interface identifiers are stored.

The interface identifiers are provided by the number of instances. The interface identifier specifies interfaces of each instance that corresponds to the service. The interface identifier is, for example, a port number or an Internet Protocol (IP) address.

Figure 12:
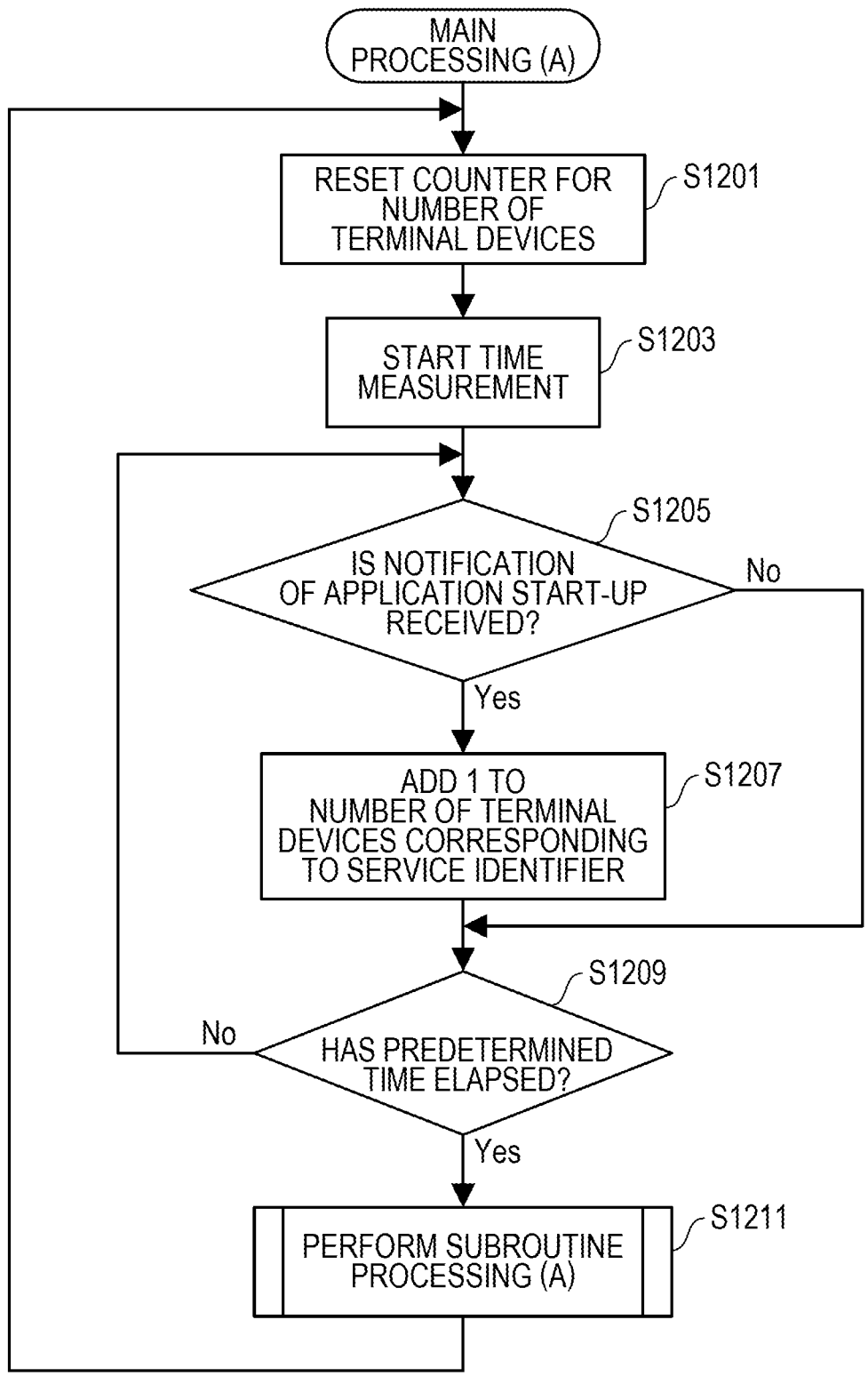
FIG. 12 is a diagram illustrating an example of a flowchart of main processing (A)

Next, an operation of the server system 101 will be described. The server system 101 according to the embodiment performs main processing (A). FIG. 12 illustrates a flowchart of the main processing (A). The calculation unit 915 resets a counter for the number of terminal devices in each the service record (S1201). The calculation unit 915 starts time measurement (S1203).

Subsequently, the calculation unit 915 determines whether or not the reception unit 913 has received a notification of application start-up from the terminal device 105 (S1205). In a case where it is determined that the notification of application start-up is not received, the processing proceeds to S1209.

Meanwhile, in a case where it is determined that the notification of application start-up is received, the calculation unit 915 adds 1 to the number of terminal device corresponding to a service identifier included in the notification (S1207). That is, the calculation unit 915 adds 1 to the counter for the number of terminal devices of the service record specified by the service identifier.

Meanwhile, the notification of application start-up is an example of a notification indicating a predetermined operation timing of a previous step in which the terminal device 105 uses the service. That is, a start-up timing of a program (application 503) that accesses the service corresponds to the predetermined operation timing.

The calculation unit 915 determines whether or not a predetermined time has elapsed from the processing of S1203 (S1209). In a case where it is determined that the predetermined time has not elapsed yet, the processing returns to the processing described in S1205, and the above-described processing is repeated.

In a case where it is determined that the predetermined time has elapsed, the auto-scaler 911 performs subroutine processing (A) (S1211).

Figure 13:
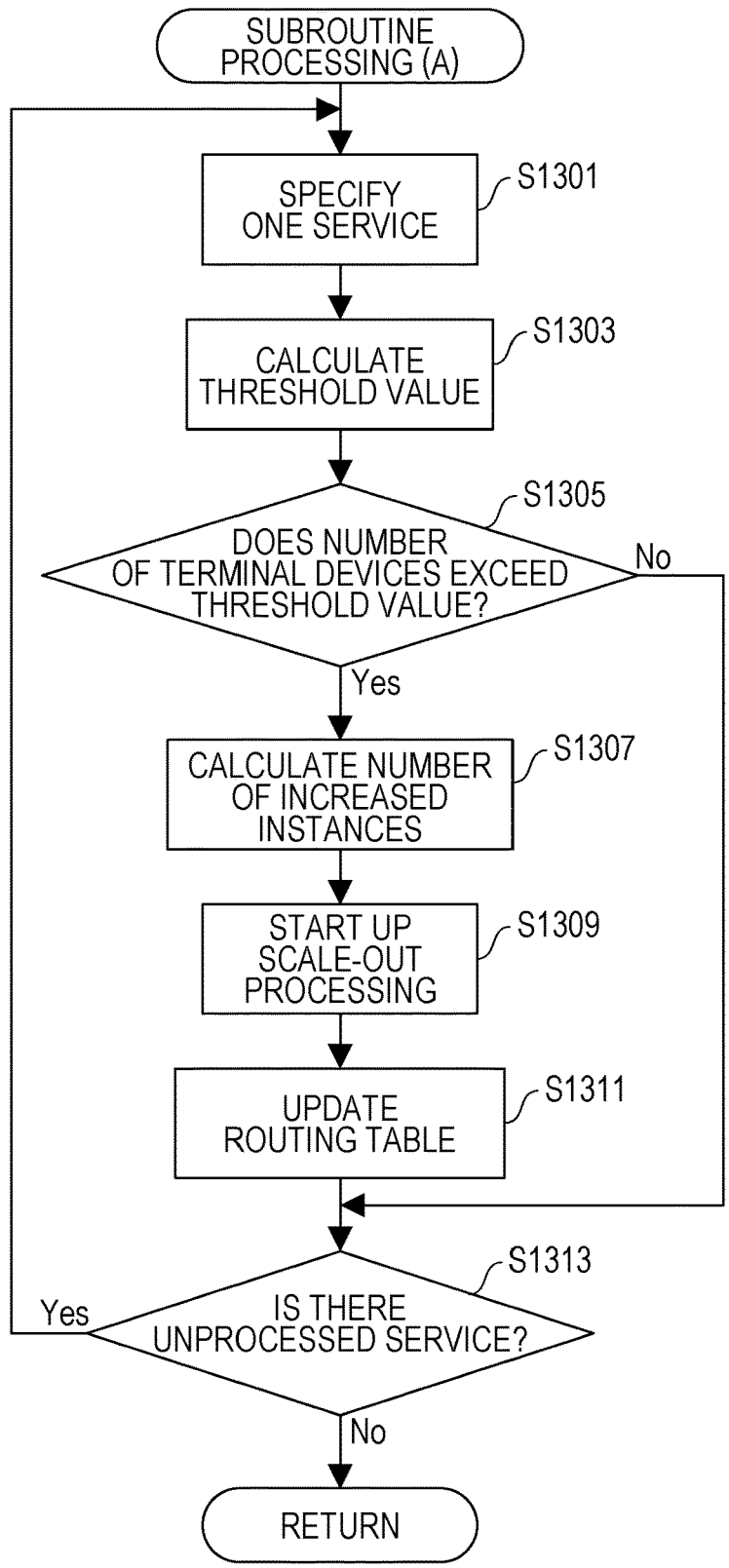
FIG. 13 is a diagram illustrating an example of a flowchart of subroutine processing (A)

FIG. 13 illustrates the subroutine processing (A). The determination unit 919 specifies one service (S1301). Specifically, the determination unit 919 specifies one service record.

The determination unit 919 calculates a threshold value (S1303). For example, the determination unit 919 calculates the threshold value by multiplying a value obtained by subtracting the number of most recent accesses from an upper limit value of the number of accesses in the current number of instances by a predetermined coefficient. The predetermined coefficient is, for example, a value less than 1. However, the predetermined coefficient may be 1. Alternatively, the predetermined coefficient may be greater than 1.

The determination unit 919 determines whether or not the counter for the number of terminal devices of the service record exceeds the threshold value (S1305). In a case where it is determined that the number of terminal devices does not exceed the threshold value, the processing proceeds to S1313.

Meanwhile, in a case where it is determined that the number of terminal devices exceeds the threshold value, scale-out processing is performed. Accordingly, the determination unit 919 obtains the number of increased instances (S1307). For example, the determination unit 919 specifies the number of instances in which the number of terminal devices corresponds to a range of the number corresponding accesses, based on the service table, and obtains the increased number by subtracting the number of current instances from the number of instances.

The scaling unit 921 starts up the scale-out processing corresponding to an increased number (S1309). That is, the scaling unit 921 performs processing of increasing the instance of the service.

The update unit 923 updates a routing table (S1311). That is, the update unit 923 adds an interface identifier of the newly installed instance to the routing table.

The determination unit 919 determines whether or not there is an unprocessed service (S1313). In a case where it is determined that there is an unprocessed service, the processing returns to the processing described in S1301, and the above-described processing is repeated. Meanwhile, in a case where it is determined that there is no unprocessed service, the subroutine processing (A) ends and returns to the main processing (A) of a calling source.

The description returns to the main processing (A) illustrated in FIG. 12. If the subroutine processing (A) is restored, the processing returns to the processing described in S1201 and repeats the above-mentioned processing.

According to the embodiment, the scale-out may start before an actual access frequency increases, in accordance with the increase of the terminal devices 105 in which the application 503 is started up.

In a certain example, the timing when the number of terminal devices 105 in which the application 503 starts up does not coincide with the timing when an actual access frequency increases. The timings may be significantly shifted. Paying attention to the timing shift, the scale-out may be performed before the access frequency increases, by appropriately capturing an increase tendency of the terminal devices 105 in which the application 503 starts up.

Meanwhile, a service is, for example, a function that the server system 101 provides to the application 503 which is a client. The Access is, for example, to transmit a message requesting the server system 101 to provide the function. Timing of a certain operation means, for example, a point of time when the operation is detected, a point of time when instruction of an operation is received, a point of time when the operation starts, a point of time when the operation is being performed, or a point of time when the operation ends.

Embodiment 2

In the embodiment, an example will be described in which it is determined whether to perform the scale-out and whether to perform the scale-in, based on the number of terminal devices 105 in which the application 503 operates.

In the embodiment, the application table manages a state of the application 503. FIG. 14 illustrates an example of the application table according to Embodiment 2. The application record includes a field to which the state is set in addition to the field in which the application name is stored and a field in which the service identifier is stored.

The field of a state has "operation" or "stop" which is set. The "operation" indicates that the application 503 is in a state of operation. The "stop" indicates that the application 503 is in a state of stop.

Figure 15:
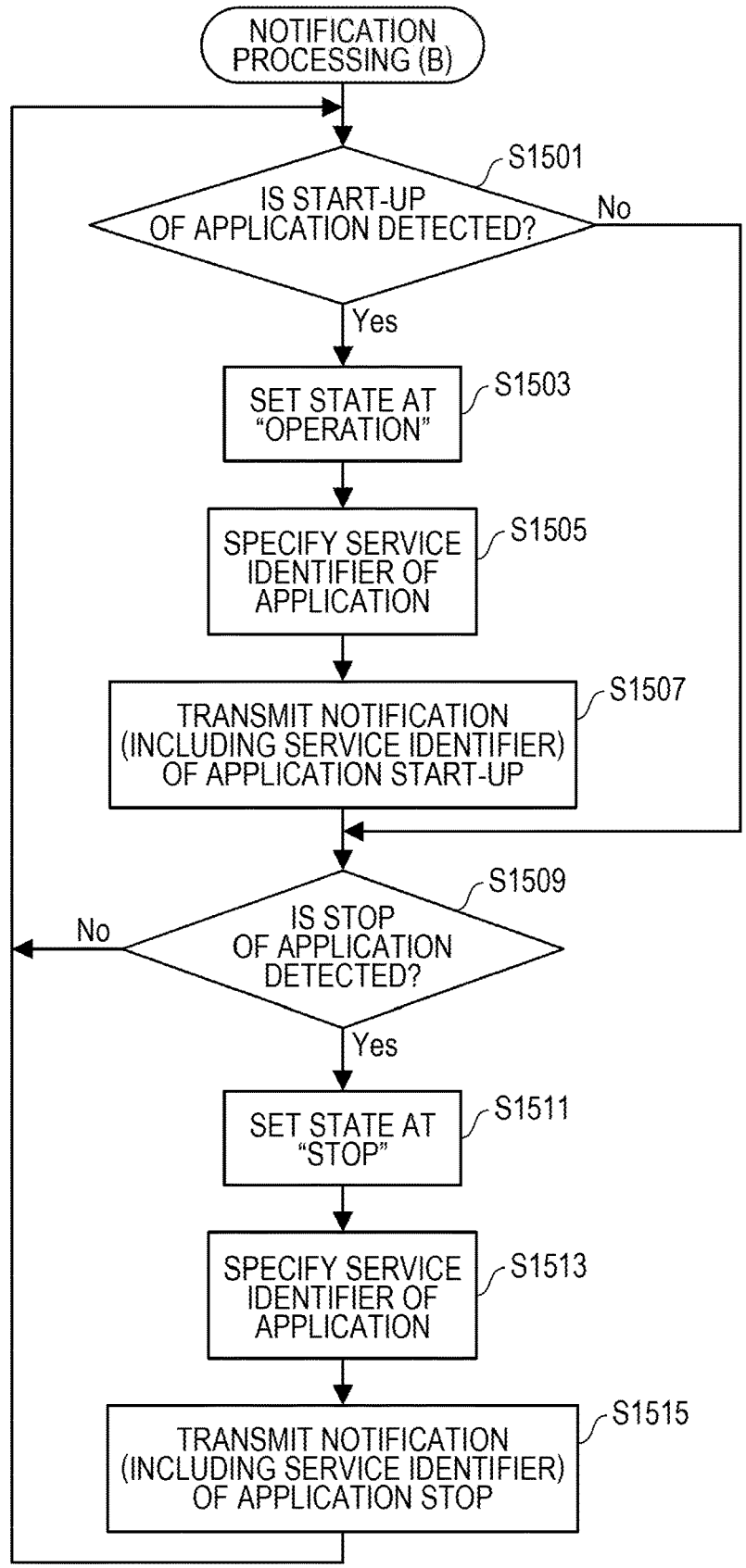
FIG. 15 is a diagram illustrating an example of a flowchart of notification processing (B)

The terminal device 105 according to the embodiment performs notification processing (B). A flowchart of the notification processing (B) is illustrated in FIG. 15. The detection unit 509 determines whether or not start-up of the application 503 is detected (S1501). In a case where it is determined that the start-up of the application 503 is not detected, the processing proceeds to S1509.

In a case where it is determined that the start-up of the application 503 is detected, the detection unit 509 sets "operation" in the field of state in the application record (S1503). The detection unit 509 specifies a service identifier corresponding to the started-up application 503, based on the application record (S1505). Then, the transmission unit 511 transmits a notification (including the service identifier) of the application start-up to the server system 101 (S1507).

The detection unit 509 determines whether or not stop of the application 503 is detected (S1509). For example, the detection unit 509 acquires a name of the process from the OS 501. In a case where the name of the process in which operation is completed coincides with the name of the application 503, the detection unit detects stop of the application 503. In a case where it is determined that stop of the application 503 is not detected, the processing returns to the processing described in S1501 and the above-described processing is repeated.

In a case where it is determined that stop of the application 503 is detected, the detection unit 509 sets "stop" in the field of state in the application record (S1511). The detection unit 509 specifies the service identifier corresponding to the stopped application 503, based on application record (S1513). The transmission unit 511 transmits a notification (including the service identifier) of the application stop to the server system 101 (S1515). Then, the processing returns to the processing described in S1501, and the above-described processing is repeated.

Figure 16:
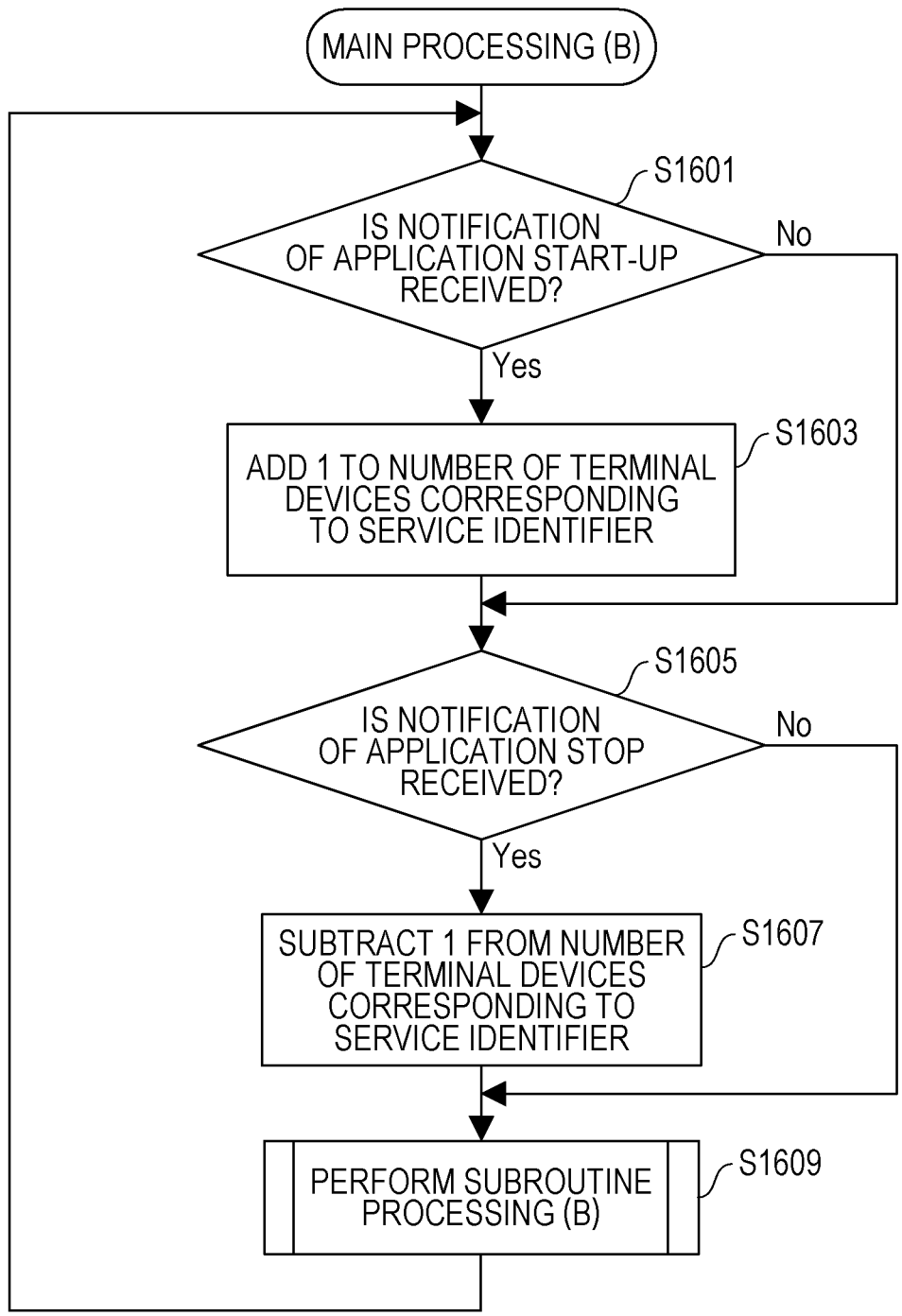
FIG. 16 is a diagram illustrating an example of a flowchart of main processing (B)

The server system 101 according to the embodiment performs main processing (B). A flowchart of the main processing (B) is illustrated in FIG. 16. Meanwhile, at the time when the main processing (B) starts, it is assumed that the counter for the number of terminal devices in each service record is set to zero.

The calculation unit 915 determines whether or not in the reception unit 913 receives the notification of application start-up from the terminal device 105 (S1601). In a case where it is determined that the notification of application start-up is not received, the processing proceeds to processing of S1605.

Meanwhile, the notification of application start-up is an example of a notification indicating a predetermined operation timing of the previous step in which the terminal device 105 uses the service. That is, a start-up timing of a program (application 503) that accesses the service corresponds to the predetermined operation timing.

Meanwhile, in a case where it is determined that the notification of application start-up is received, the calculation unit 915 adds 1 to the number of terminal devices corresponding to the service identifier included in the notification (S1603). That is, the calculation unit 915 adds 1 to the counter for the number of terminal devices of the service record specified by the service identifier.

The calculation unit 915 determines whether or not the reception unit 913 receives the notification of application stop from the terminal device 105 (S1605). In a case where it is determined that the notification of application stop is not received, the processing proceeds to the processing of S1609.

Meanwhile, in a case where it is determined that the notification of application stop is received, the calculation unit 915 subtracts 1 from the number of terminal devices corresponding to the service identifier included in the notification (S1607). That is, the calculation unit 915 subtracts 1 from the counter for the number of terminal devices of the service record specified by the service identifier.

Figure 17:
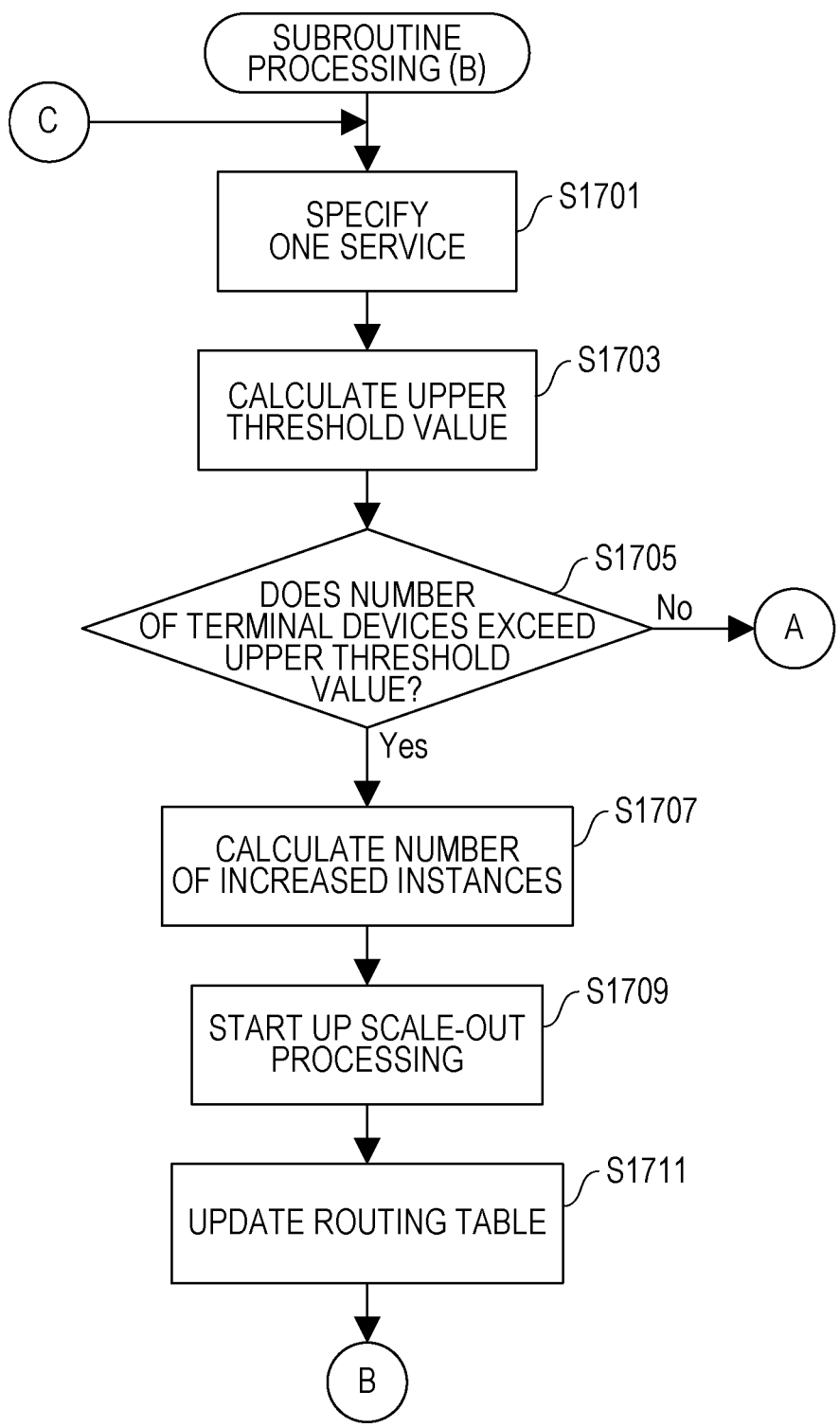
FIG. 17 is a diagram illustrating an example of a flowchart of subroutine processing (B)

The auto-scaler 911 according to the embodiment performs subroutine processing (B) (S1609). A flowchart of the subroutine processing (B) is illustrated in FIG. 17. The determination unit 919 specifies one service (S1701). Specifically, the determination unit 919 specifies one service record.

The determination unit 919 calculates an upper threshold value (S1703). For example, the determination unit 919 calculates the upper threshold value by subtracting a predetermined value from the upper limit value of the number of accesses in the current instances. The predetermined value is, for example, a positive value. However, the predetermined value may be zero. Alternatively, the predetermined value may be a negative value.

In another example, the determination unit 919 may calculate the upper threshold value by multiplying the upper limit value of the number of accesses in the current instance by a predetermined coefficient. The predetermined coefficient is, for example, a value smaller than 1. However, the predetermined coefficient may be 1. Alternatively, the predetermined coefficient may be larger than 1.

In addition, in a case where the number of current instances is a predetermined maximum value, for example, the upper threshold value may be infinite.

The determination unit 919 determines whether or not the counter for the number of terminal devices of the service record exceeds the upper threshold value (S1705). In a case where it is determined that the number of terminal devices exceeds the upper threshold value, the determination unit 919 obtains the number of increased instances (S1707). The processing of S1707 to S1711 is the same as the processing of S1307 to S1311 illustrated in FIG. 13. Then, the processing proceeds to the processing of S1811 illustrated in FIG. 18 via a terminal B.

Figure 18:
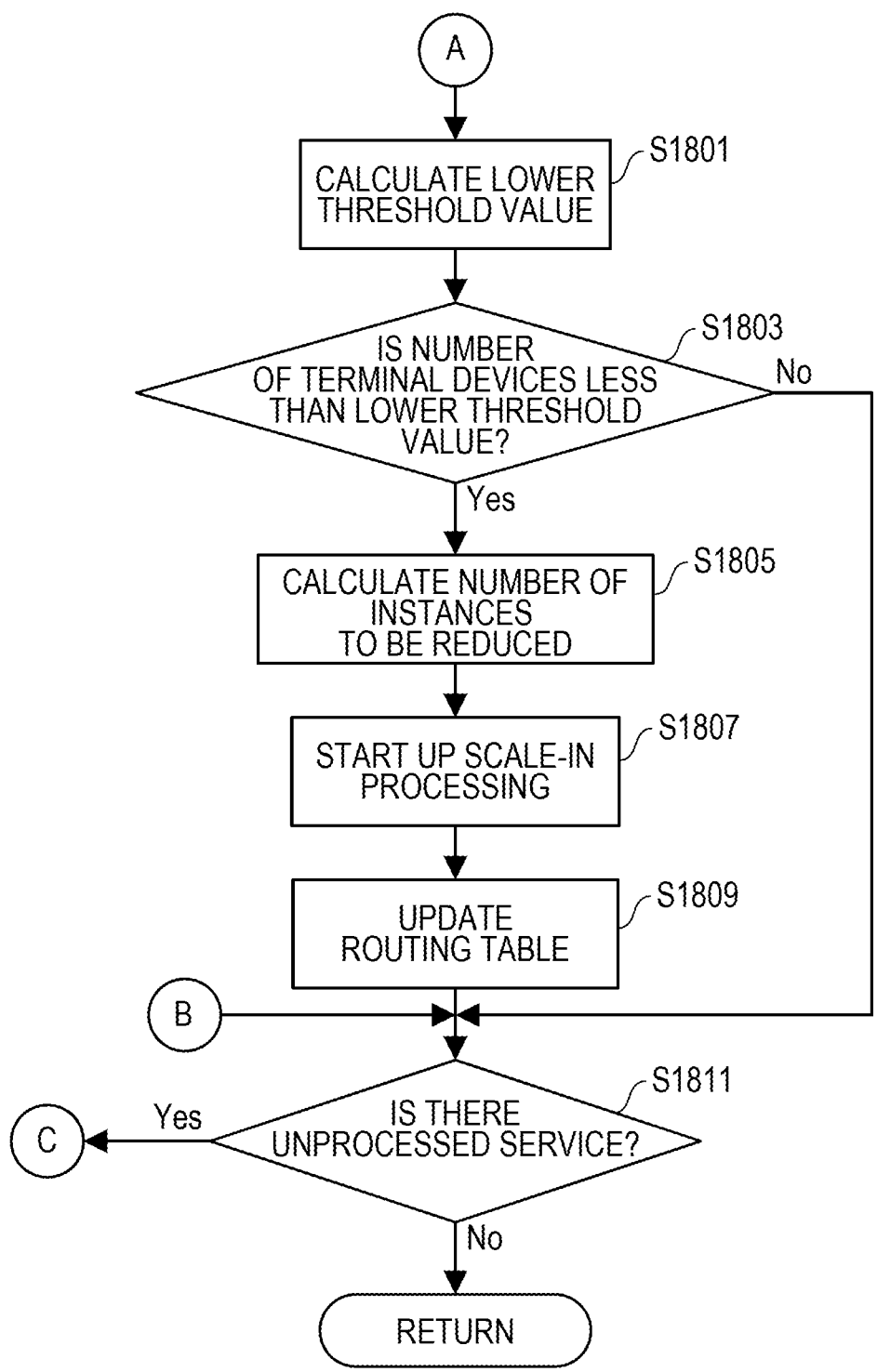
FIG. 18 is a diagram illustrating an example of a flowchart of subroutine processing (B)

Meanwhile, in a case where it is determined that the counter for the number of terminal devices of the service record does not exceed the upper threshold value in S1705, the processing proceeds to processing of S1801 illustrated in FIG. 18 via a terminal A.

The description returns to FIG. 18. The determination unit 919 calculates a lower threshold value (S1801). For example, the determination unit 919 calculates the lower threshold value by adding a predetermined value to the lower limit value of the number of accesses in the number of current instances. The predetermined value is, for example, a positive value. However, the predetermined value may be zero. Alternatively, the predetermined value may be a negative value.

In another example, the determination unit 919 may calculate the lower threshold value by multiplying the lower limit value of the number of accesses in the number of current instances by a predetermined coefficient. The predetermined coefficient is, for example, a value larger than 1. However, the predetermined coefficient may be 1. Alternatively, the predetermined coefficient may be smaller than 1.

In addition, in a case where the number of current instances is a predetermined minimum value, for example, the lower threshold value may be set to zero.

The determination unit 919 determines whether or not the counter for the number of terminal devices of the service record is less than the lower threshold value (S1803). In a case where it is determined that the number of terminal devices is not less than the lower threshold value, the processing proceeds to processing described in S1811.

Meanwhile, in a case where it is determined that the number of terminal devices is less than the lower threshold value, the determination unit 919 obtains the number of instances to be reduced (S1805). For example, the determination unit 919 specifies the number of instances in which the number of terminal devices corresponds to a range of the number of corresponding accesses, and calculates the number of instances to be reduced by subtracting the number of specified instances from the number of current instances.

The scaling unit 921 starts up scale-in processing corresponding to the number of resources to be reduced (S1807). That is, the scaling unit 921 performs processing of decreasing the instances of the service.

The update unit 923 updates a routing table (S1809). That is, the update unit 923 deletes the interface identifier in the deleted instance from the routing table.

The determination unit 919 determines whether or not there is an unprocessed service (S1811). In a case where it is determined that there is an unprocessed service, the processing returns to the processing of S1701 illustrated in FIG. 17 via a terminal C.

Meanwhile, in a case where it is determined that there is no unprocessed service, the subroutine processing (B) ends and returns to the main processing (B) of a calling source.

The description returns to the main processing (B) illustrated in FIG. 16. If the processing is restored from the subroutine processing (B), the processing returns to the processing described in S1601 and the above-described processing is repeated.

According to the embodiment, the scale-out may start before an actual access frequency increases, in accordance with the increase of the terminal devices 105 in which the application 503 operates. In addition, the scale-in may start in accordance with the reduction of the terminal devices 105 in which the application 503 operates.

In a certain example, the timing when the number of terminal device 105 in which the application 503 operates increases does not coincide with the timing when the actual access frequency increases. The timings may be significantly shifted. Paying attention to the timing shift, the scale-out may be performed before the access frequency increases, by appropriately capturing an increase tendency of the terminal devices 105 in which the application 503 operates. In the same manner, the scale-in may be performed before the access frequency is reduced, by appropriately capturing reduction tendency of the terminal devices 105 in which the application 503 operates.

Embodiment 3

In the embodiment, an example will be described in which it is determined whether to perform the scale-out, based on the number of terminal devices 105 which start up.

Figure 19:
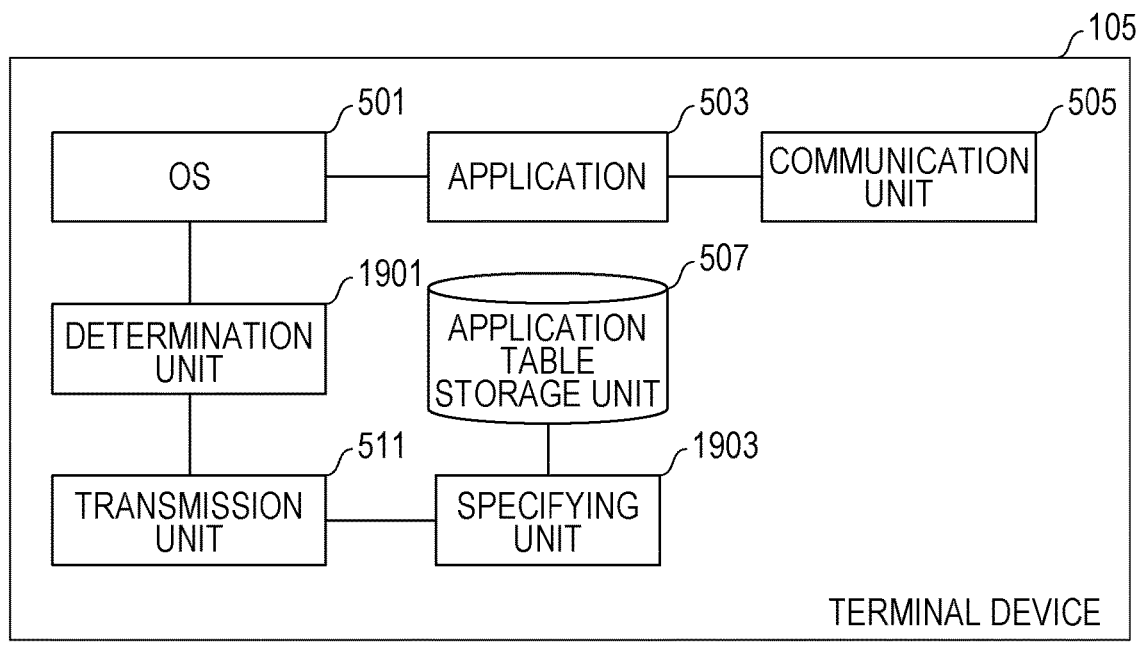
FIG. 19 is a diagram illustrating an example of a module configuration of a terminal device according to Embodiment 3.

FIG. 19 illustrates an example of a module configuration of the terminal device 105 according to Embodiment 3. The terminal device 105 according to the embodiment includes a determination unit 1901 and a specifying unit 1903. The determination unit 1901 determines whether or not, for example, the terminal device 105 itself starts up. The specifying unit 1903 specifies an identifier of the service used by the application 503 installed in the terminal device 105.

The determination unit 1901 and the specifying unit 1903 which are described above are realized by using the hardware resource (for example, FIG. 40 or 41) and a program that causes a processor to perform the processing which will be described below.

Figure 20:
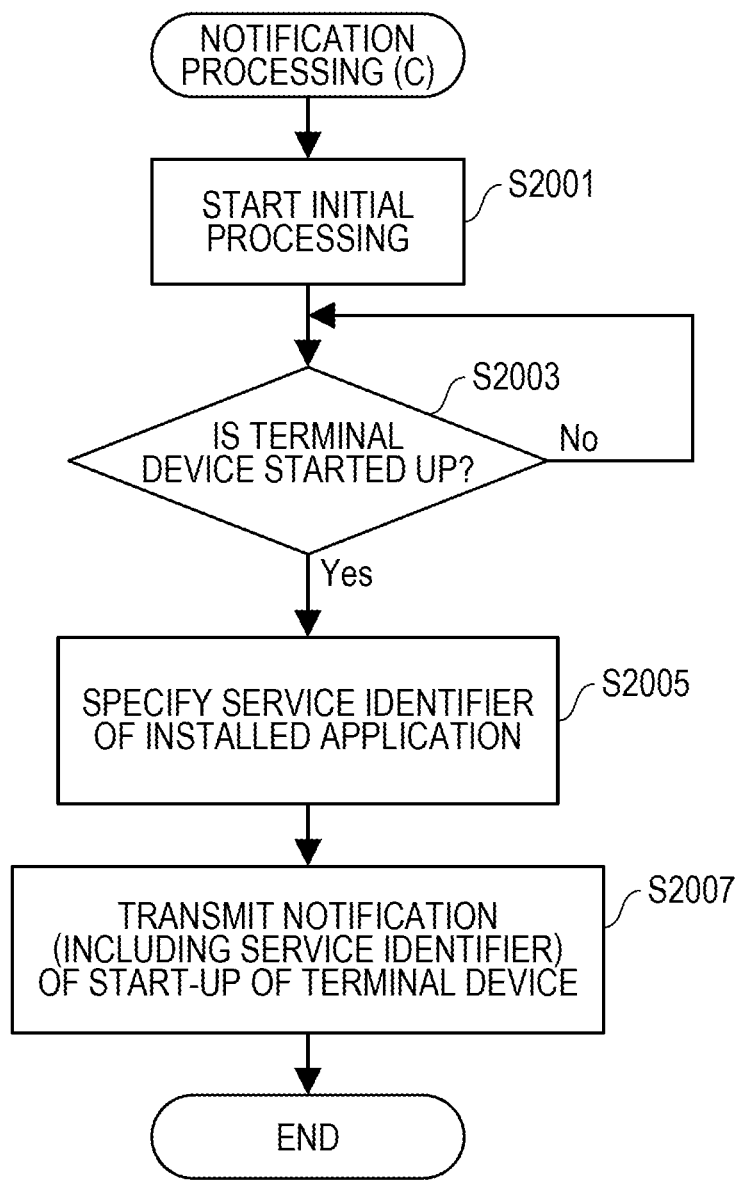
FIG. 20 is a diagram illustrating an example of a flowchart of notification processing (C)

The terminal device 105 according to the embodiment performs notification processing (C). A flowchart of the notification processing (C) is illustrated in FIG. 20. If the terminal device 105 is powered on, the OS 501 starts initial processing (S2001). Then, the determination unit 1901 determines whether or not the terminal device 105 is started up in accordance with a progress situation of the initial processing (S2003). For example, at a point of time when the initial processing reaches an intermediate step or the initial processing is completed, the determination unit 1901 determines that start-up of the terminal device 105 is completed. In a case where it is determined that start-up of the terminal device 105 is not completed, the determination unit 1901 repeats the processing of S2003.

In a case where it is determined that start-up of the terminal device 105 is completed, the specifying unit 1903 specifies the service identifier corresponding to the installed application 503 (S2005). Specifically, the specifying unit 1903 extracts the service identifier stored in the application record. In a case where a plurality of the applications 503 are installed, service identifiers corresponding to the respective applications 503 are specified.

The transmission unit 511 transmits a notification (including the service identifier) of start-up of the terminal device 105 to the server system 101 (S2007). In a case where a plurality of service identifiers are specified in S2005, the transmission unit 511 includes the plurality of service identifiers in the notification. Then, the notification processing (C) ends.

Figure 21:
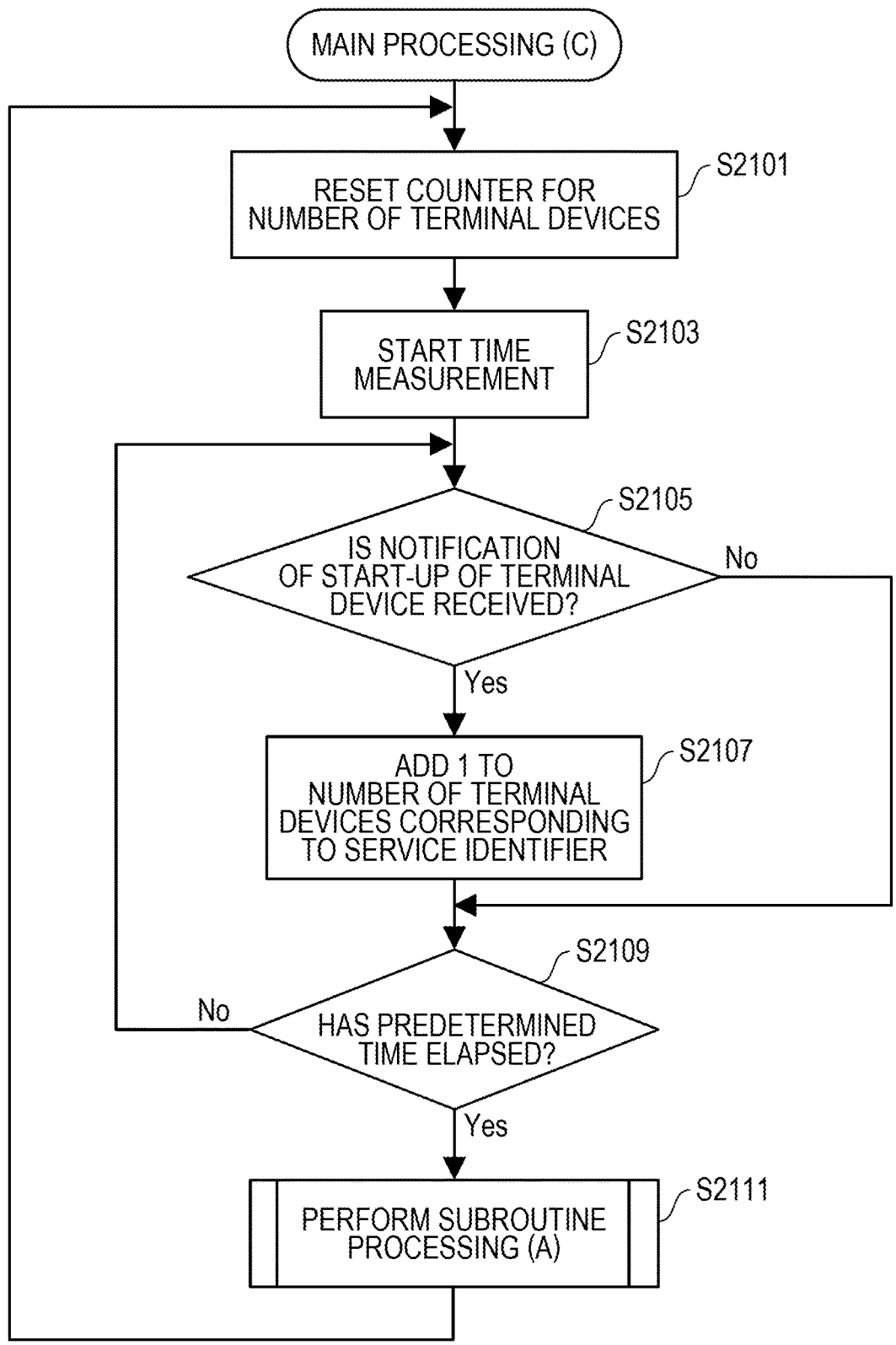
FIG. 21 is a diagram illustrating an example of a flowchart of main processing (C)

The server system 101 according to the embodiment performs main processing (C). A flowchart of the main processing (C) is illustrated in FIG. 21. The processing of S2101 and S2103 is the same as the processing of S1201 and S1203 illustrated in FIG. 12.

The calculation unit 915 determines whether or not the reception unit 913 receives the notification of the start-up of the terminal device 105 from the terminal device 105 (S2105). In a case where it is determined that the notification of the start-up of the terminal device 105 is not received, the processing proceeds to S2109.

The notification of the start-up of the terminal device 105 is an example of a notification indicating the predetermined operation timing of the previous step using the service in the terminal device 105. That is, the start-up timing of the terminal device 105 corresponds to the predetermined operation timing.

Meanwhile, in a case where it is determined that the notification of the start-up of the terminal device 105 is received, the calculation unit 915 adds 1 to the number of terminal devices corresponding to the service identifier included in the notification (S2107). That is, the calculation unit 915 adds 1 to the counter for the number of terminal devices of the service record specified by the service identifier.

The processing of S2109 and S2111 is the same as the processing of S1209 and S1211 illustrated in FIG. 12.

According to the embodiment, the scale-out may be started before an actual access frequency increases in accordance with an increase of the started-up terminal devices 105.

In a certain example, the timing when the number of started-up terminal devices 105 increases does not coincide with the timing when the actual access frequency increases. The timings may be significantly shifted. Paying attention to the timing shift, the scale-out may be performed before the access frequency increases, by appropriately capturing an increase tendency of the started-up terminal devices 105.

Embodiment 4

In the embodiment, an example will be described in which it is determined whether to perform the scale-out and whether to perform the scale-in, based on the number of terminal devices 105 in operation.

Figure 22:
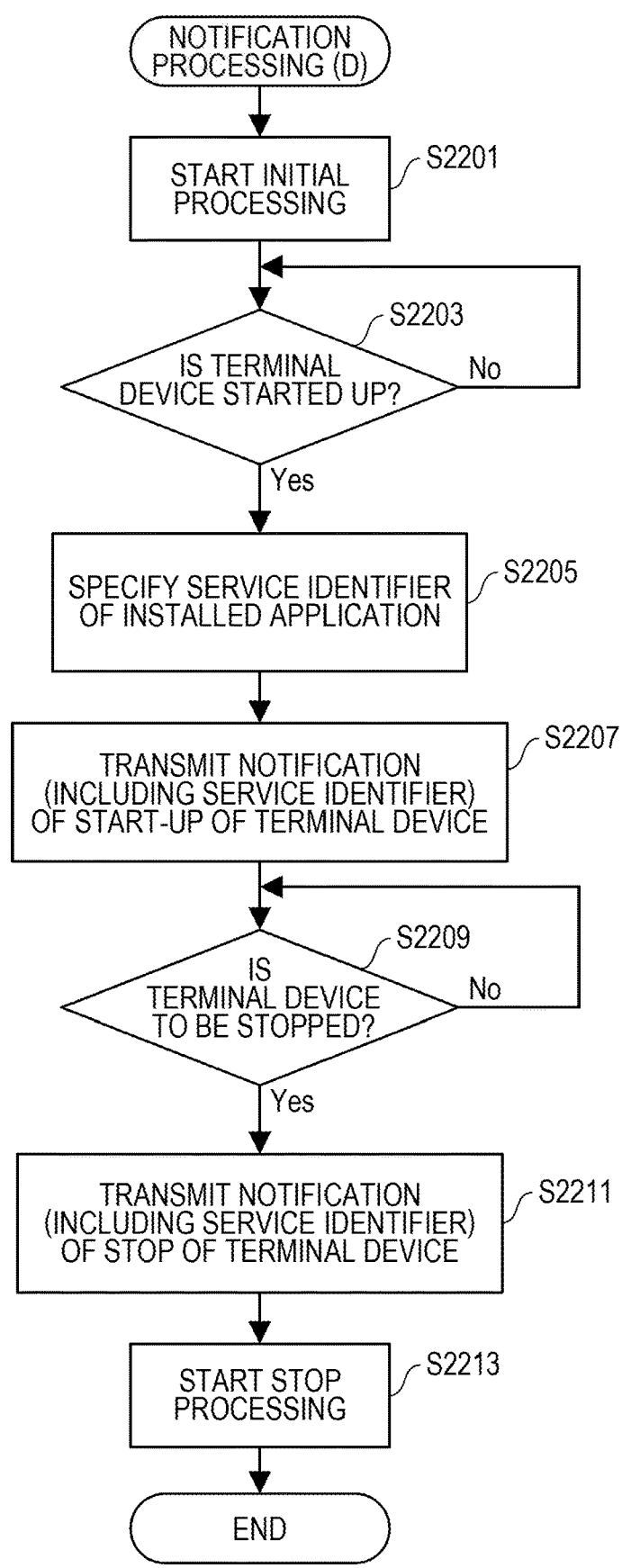
FIG. 22 is a diagram illustrating an example of a flowchart of notification processing (D)

The terminal device 105 according to the embodiment performs notification processing (D). A flowchart of the notification processing (D) is illustrated in FIG. 22. The processing of S2201 to S2207 is the same as the processing of S2001 to S2007 illustrated in FIG. 20.

The determination unit 1901 determines whether or not the terminal device 105 is to be stopped (S2209). For example, in a case where the OS 501 receives an instruction of a user to stop the terminal device 105, the determination unit 1901 determines that the terminal device 105 is to be stopped. In a case where it is not determined that the terminal device 105 is to be stopped, the processing of S2209 is repeated.

Meanwhile, in a case where it is determined that the terminal device 105 is to be stopped, the transmission unit 511 transmits a notification (including the service identifier specified in S2205) of stop of the terminal device 105 (S2211). Then, the OS 501 starts stop processing (S2213).

Figure 23:
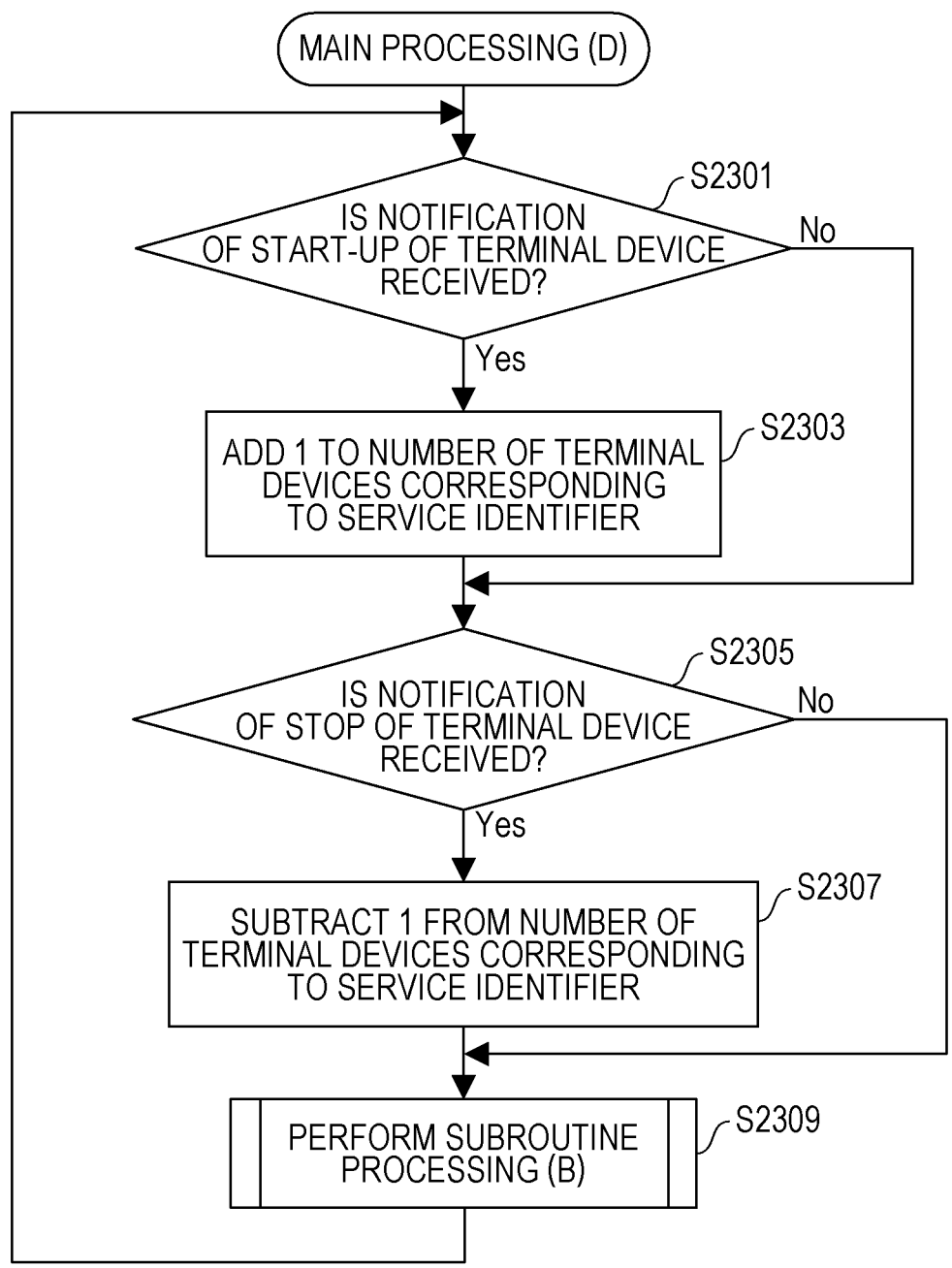
FIG. 23 is a diagram illustrating an example of a flowchart of main processing (D)

The server system 101 according to the embodiment performs main processing (D). A flowchart of the main processing (D) is illustrated in FIG. 23. The calculation unit 915 determined whether or not the reception unit 913 receives the notification of the start-up of the terminal device 105 from the terminal device 105 (S2301). In a case where it is determined that the notification of the start-up of the terminal device 105 is not received, the processing proceeds to the processing of S2305.

Meanwhile, the notification of the start-up of the terminal device 105 is an example of a notification indicating the predetermined operation timing of the previous step using the service in the terminal device 105. That is, the start-up timing of the terminal device 105 corresponds to the predetermined operation timing.

Meanwhile, in a case where it is determined that the notification of start-up of the terminal device 105 is received, the calculation unit 915 adds 1 to the number of terminal devices corresponding to the service identifier included in the notification (S2303).

The calculation unit 915 determines whether or not the reception unit 913 receives a notification of stop of the terminal device 105 from the terminal device 105 (S2305). In a case where it is determined that the notification of the stop of the terminal device 105 is not received, the processing proceeds to the processing of S2309.

Meanwhile, in a case where it is determined that the notification of the stop of the terminal device 105 is received, the calculation unit 915 subtracts 1 from the number of terminal devices corresponding to the service identifier included in the notification (S2307). That is, the calculation unit 915 subtracts 1 from the counter for the number of terminal devices of the service record identified by the service identifier.

The processing of S2309 is the same as the processing of S1609 illustrated in FIG. 16.

According to the embodiment, the scale-out may be started before an actual access frequency increases, in accordance with an increase of the terminal devices 105 in operation. In addition, scale-in may be started in accordance with reduction of the terminal devices 105 in operation.

In a certain example, the timing when the number of terminal devices 105 in operation increases does not coincide with the timing when an actual access frequency increases. The timings may be significantly shifted. Paying attention to the timing shift, the scale-out may be performed before the access frequency increases, by appropriately capturing an increase tendency of the terminal devices 105 in operation. In the same manner, the scale-in may be performed before the access frequency is reduced, by appropriately capturing reduction tendency of the terminal devices 105 in operation.

Embodiment 5

In the embodiment, an example will be described in which it is determined whether to perform the scale-out, based on the number of terminal devices 105 in which a loader used for downloading the application 503 starts up.

Figure 24:
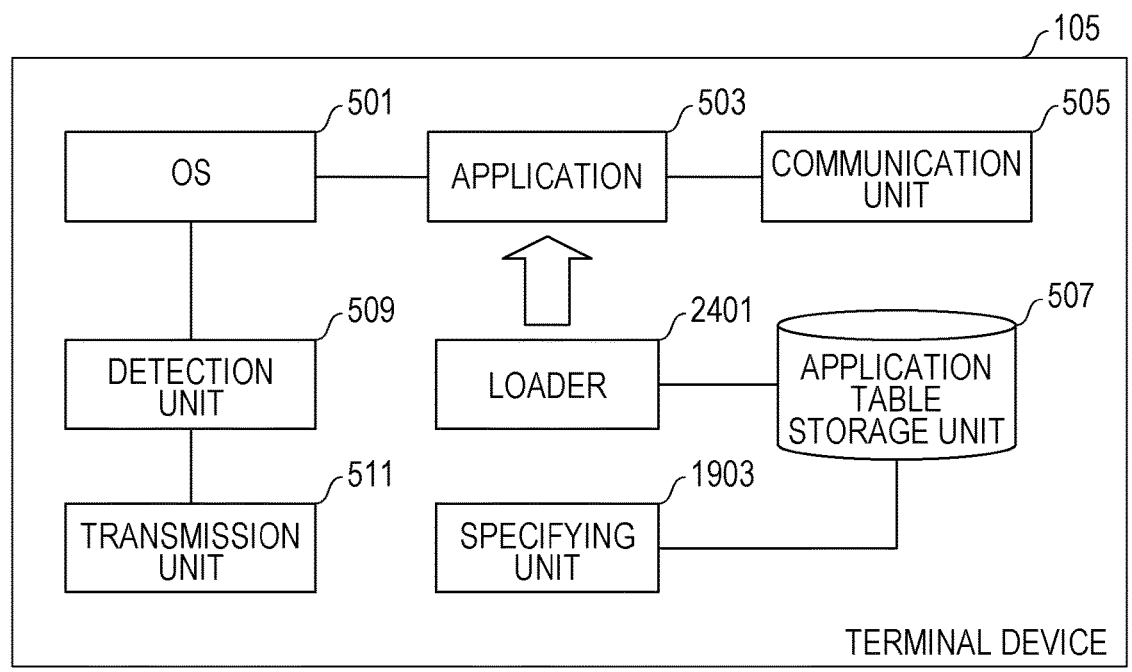
FIG. 24 is a diagram illustrating an example of a module configuration of a terminal device according to Embodiment 5.

FIG. 24 illustrates an example of a module configuration of the terminal device 105 according to Embodiment 5. The terminal device 105 according to the embodiment includes a loader 2401. The loader 2401 downloads, for example, the application 503 from the server system 101. Meanwhile, it is assumed that an application table according to the embodiment includes a record corresponding to the application 503 which is downloaded.

Figure 25:
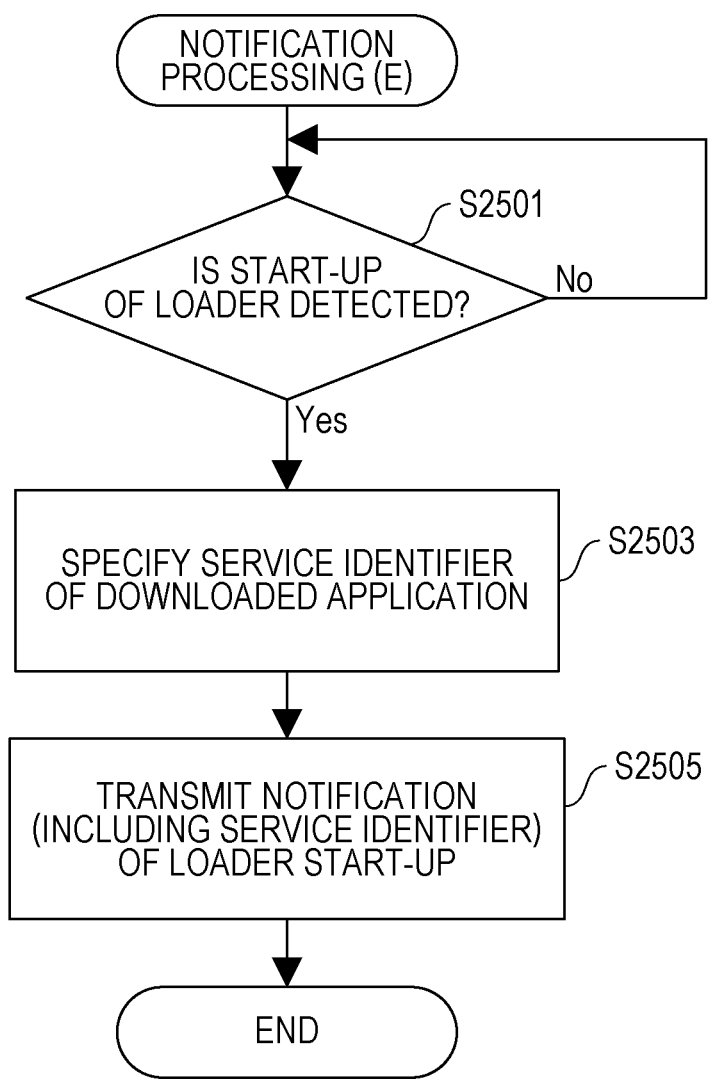
FIG. 25 is a diagram illustrating an example of a flowchart of notification processing (E)

The terminal device 105 according to the embodiment performs notification processing (E). A flowchart of the notification processing (E) is illustrated in FIG. 25. The detection unit 509 determines whether or not start-up of the loader 2401 is detected (S2501). For example, the detection unit 509 acquires a name of the process from the OS 501, and in a case where the name of the process which starts a new operation coincides with the name of the loader 2401, the detection unit 509 detects the start-up of the loader 2401. In a case where it is determined that the start-up of the loader 2401 is not detected, the processing of S2501 is repeated.

In a case where it is determined that the start-up of the loader 2401 is detected, the specifying unit 1903 specifies the service identifier of the application 503 which is downloaded (S2503). In this example, it is assumed that the application 503 which is downloaded by the loader 2401 is predetermined. Specifically, the specifying unit 1903 extracts the service identifier stored in the application record. In a case where a plurality of applications 503 are downloaded, the service identifiers corresponding to each application 503 are specified.

The transmission unit 511 transmits a notification (including the service identifier) of the start-up of the loader to the server system 101 (S2505). In a case where the plurality of service identifiers are specified in S2503, the transmission unit 511 includes the plurality of service identifiers in the notification. Then the notification processing (E) ends.

Figure 26:
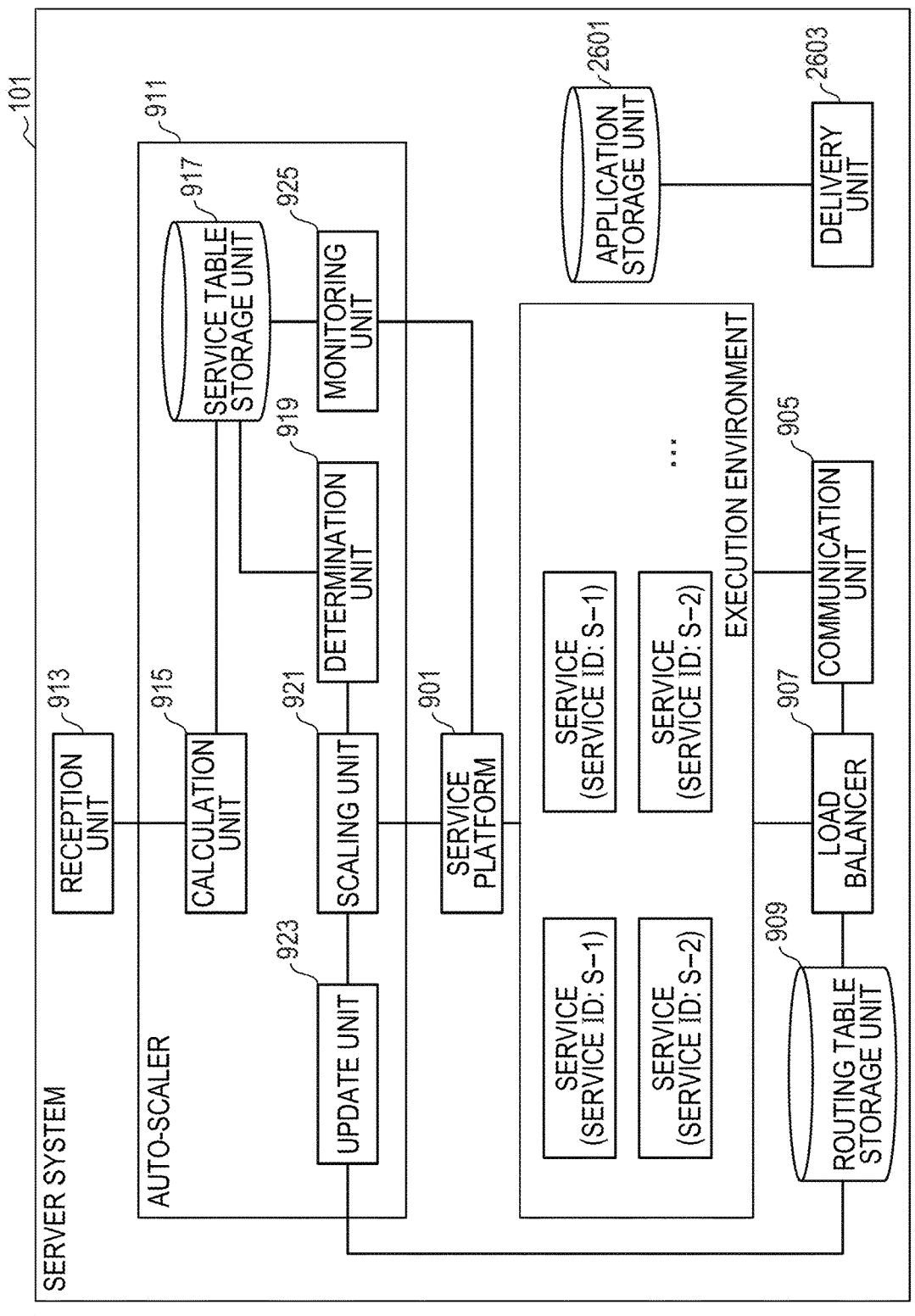
FIG. 26 is a diagram illustrating an example of a module configuration of a server system according to Embodiment 5.

The description returns to the server system 101. FIG. 26 illustrates an example of a module configuration of the server system 101 according to Embodiment 5. The server system 101 according to the embodiment includes an application storage unit 2601 and a delivery unit 2603. The application storage unit 2601 stores the application 503 which is delivered. The delivery unit 2603 delivers the application 503 in accordance with a request from the terminal device 105. Meanwhile, the application storage unit 2601 and the delivery unit 2603 may be independently configured as a single server device 103.

The delivery unit 2603 is realized by using the hardware resource (for example, FIG. 41) and a program that causes a processor to perform the processing which will be described below.

The application storage unit 2601 is realized by using the hardware resource (for example, FIG. 41).

Figure 27:
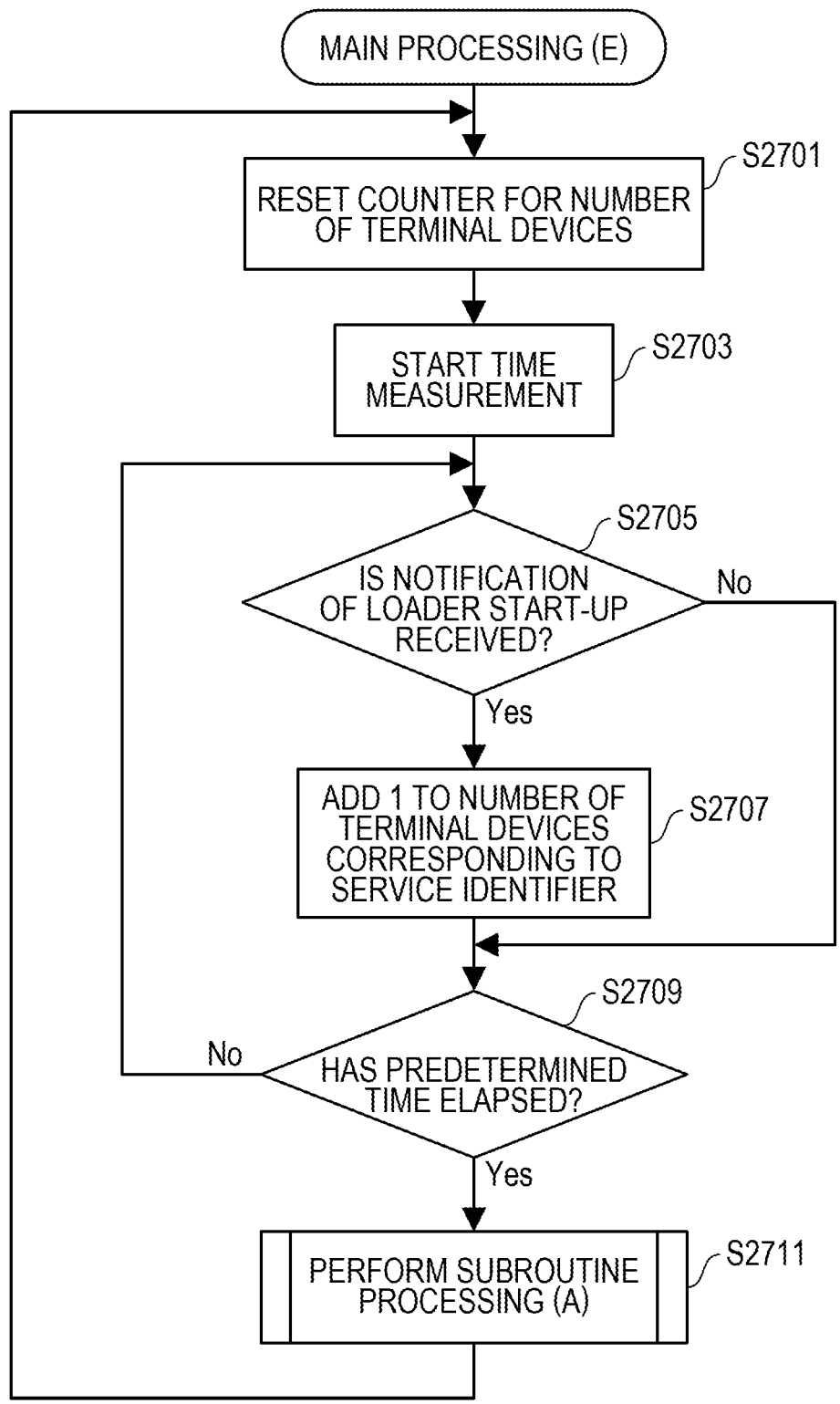
FIG. 27 is a diagram illustrating an example of a flowchart of main processing (E)

The server system 101 according to the embodiment performs main processing (E). A flowchart of the main processing (E) is illustrated in FIG. 27. The processing of S2701 and S2703 is the same as the processing of S1201 and S1203 illustrated in FIG. 12.

The calculation unit 915 determines whether or not the reception unit 913 receives a notification of loader start-up from the terminal device 105 (S2705). In a case where it is determined that the notification of the loader start-up is not received, the processing proceeds to S2709.

Meanwhile, the notification of the loader start-up is an example of a notification indicating a predetermined operation timing of the previous step using the service in the terminal device 105. That is, the start-up timing of the loader 2401 corresponds to a predetermined operation timing.

Meanwhile, in a case where it is determined that the notification of the loader start-up is received, the calculation unit 915 adds 1 to the number of terminal devices corresponding to the service identifier included in the notification (S2707). That is, the calculation unit 915 adds 1 to the counter for the number of terminal devices of the service record identified by the service identifier.

The processing of S2709 and S2711 is the same as the processing of steps S1209 and S1211 illustrated in FIG. 12.

According to the embodiment, the scale-out may be started before an actual access frequency increases, in accordance with an increase of the terminal devices 105 in which the loader 2401 starts up.

In a certain example, the timing when the number of terminal devices 105 in which the loader 2401 starts up increases does not coincide with the timing when the actual access frequency increases. The timing may be significantly shifted. Paying attention to the timing shift, the scale-out may be performed before the access frequency increases, by appropriately capturing an increase tendency of the terminal devices 105 in which the loader 2401 starts up.

Embodiment 6

In the embodiment, an example will be described in which it is determined whether to perform a scale-out and whether to perform a scale-in, based on the number of terminal devices 105 in which a loader 2401 used for downloading the application 503 operates.

Figure 28:
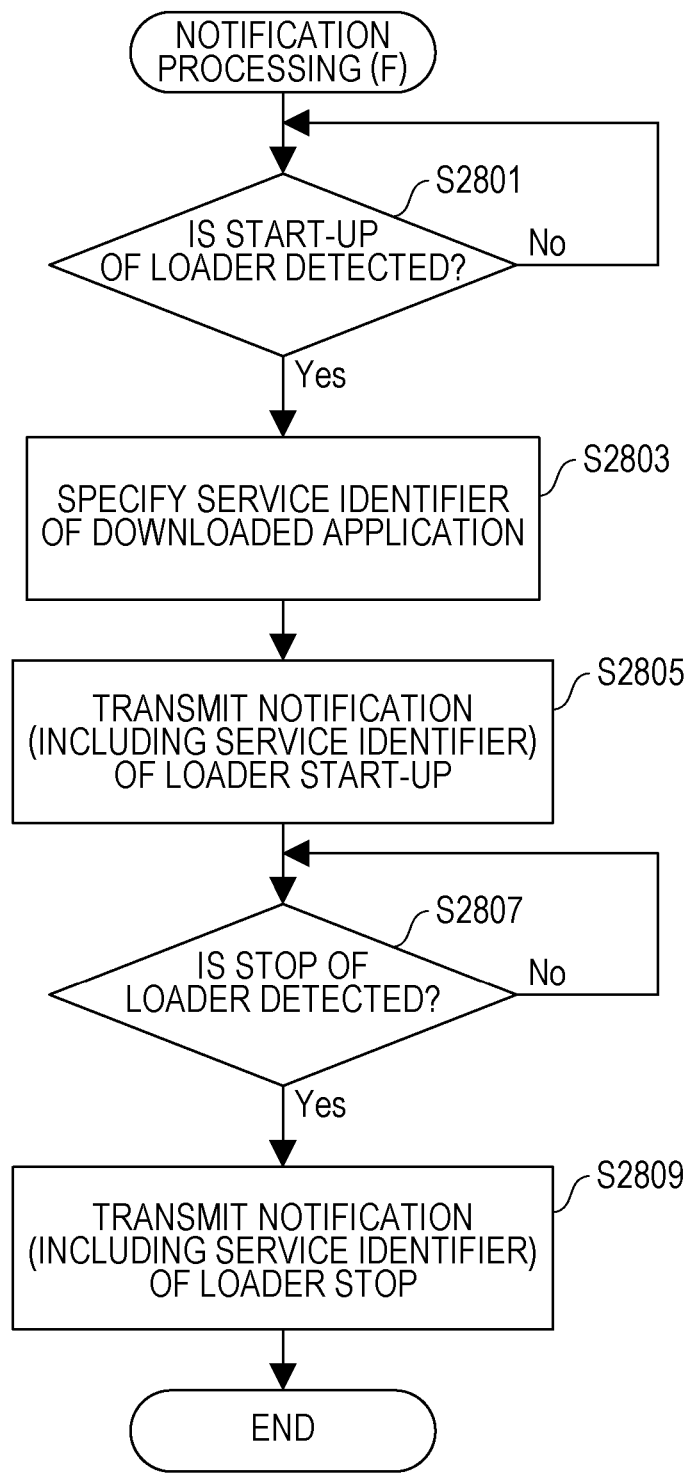
FIG. 28 is a diagram illustrating an example of a flowchart of notification processing (F)

The terminal device 105 according to the embodiment performs notification processing (F). A flowchart of the notification processing (F) is illustrated in FIG. 28. The processing of S2801 to S2805 is the same as the processing of S2501 to S2505 illustrated in FIG. 25.

The detection unit 509 determines whether or not stop of the loader 2401 is detected (S2807). For example, the detection unit 509 acquires a name of a process from the OS 501, and in a case where the name of the process in which an operation is completed coincides with a name of the loader 2401, the detection unit 509 detects the stop of the loader 2401. In a case where it is determined that the stop of the loader 2401 is not detected, the processing of S2807 is repeated.

Meanwhile, in a case where it is determined that the stop of the loader 2401 is detected, the transmission unit 511 transmits a notification (including the service identifier specified in S2803) of the loader stop (S2809). Then, the notification processing (F) ends.

Figure 29:
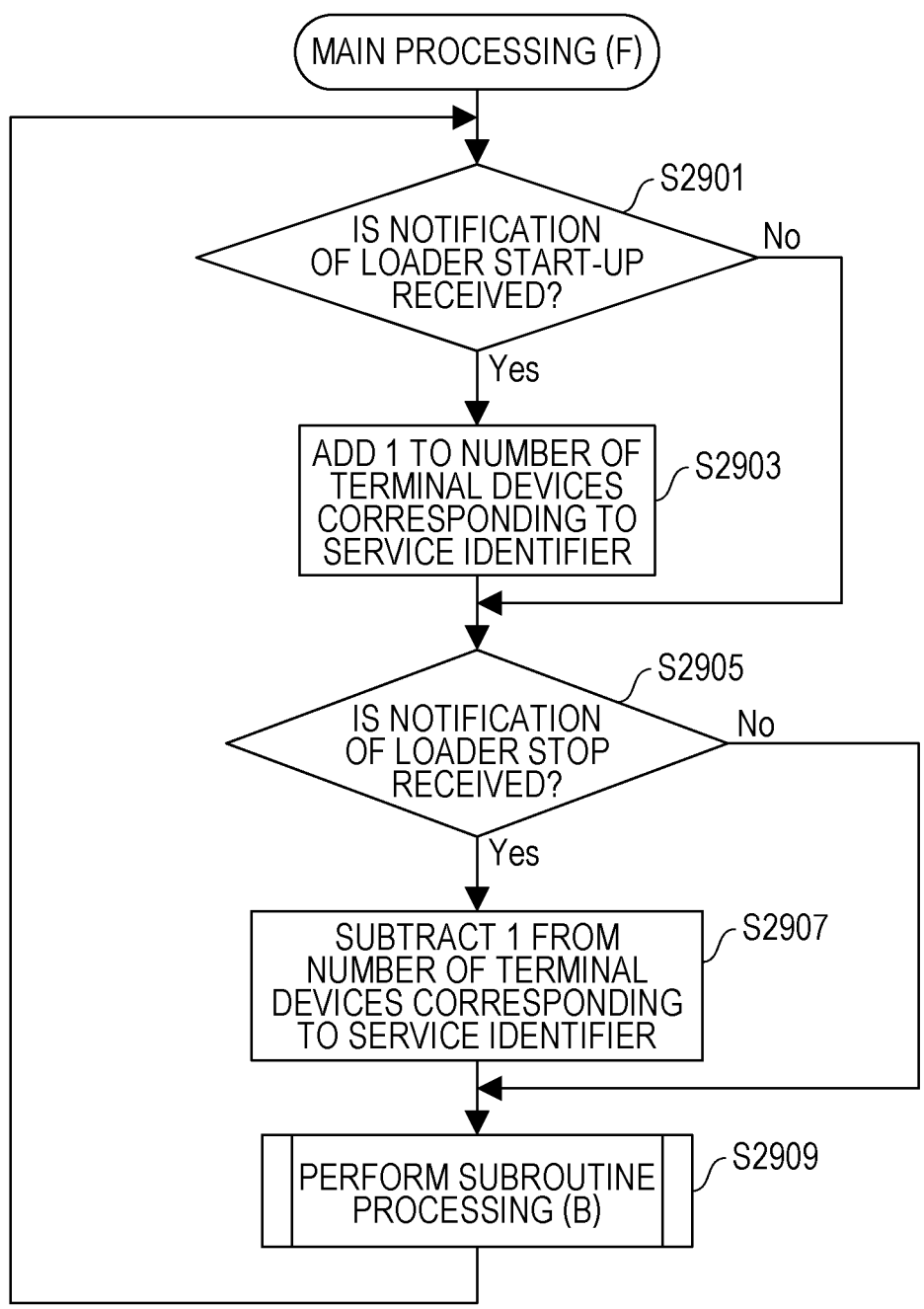
FIG. 29 is a diagram illustrating an example of a flowchart of a main processing (F)

The server system 101 according to the embodiment performs main processing (F). A flowchart of the main processing (F) is illustrated in FIG. 29. The calculation unit 915 determines whether or not the reception unit 913 receives the notification of the loader start-up from the terminal device 105 (S2901). In a case where it is determined that the notification of the loader start-up is not received, the processing proceeds to the processing of S2905.

Meanwhile, the notification of the loader start-up is an example of a notification indicating a predetermined operation timing of the previous step using the service in the terminal device 105. That is, a start-up timing of the loader 2401 corresponds to the predetermined operation timing.

Meanwhile, in a case where it is determined that the notification of the loader start-up is received, the calculation unit 915 adds 1 to the number of terminal devices corresponding to the service identifier included in the notification (S2903).

The calculation unit 915 determines whether or not the reception unit 913 receives a notification of loader stop from the terminal device 105 (S2905). In a case where it is determined that the notification of the loader stop is not received, the processing proceeds to the processing of S2909.

Meanwhile, in a case where it is determined that the notification of the loader stop is received, the calculation unit 915 subtracts 1 from the number of terminal device corresponding to the service identifier included in the notification (S2907). That is, the calculation unit 915 subtracts 1 from the counter for the number of terminal devices of the service record specified by the service identifier.

The processing of S2909 is the same as the processing of S1609 illustrated in FIG. 16.

According to the embodiment, the scale-out may be started before an actual access frequency increases, in accordance with an increase of the terminal devices 105 in which the loader 2401 operates. In addition, the scale-in may be started in accordance with reduction of the terminal devices 105 in which the loader 2401 operates.

In a certain example, the timing when the number of terminal devices 105 in which the loader 2401 operates increases does not coincide with the timing when the actual access frequency increases. The timings may be significantly shifted. Paying attention to the timing shift, the scale-out may be performed before the access frequency increases, by appropriately capturing an increase tendency of the terminal devices 105 in which the loader 2401 operates. In the same manner, the scale-in may be performed before the access frequency is reduced, by appropriately capturing reduction tendency of the terminal devices 105 in which the loader 2401 operates.

Embodiment 7

In the embodiment, an example will be described in which it is determined whether to perform the scale-out, based on the number of terminal device 105 in which downloading the application 503 starts.

Figure 30:
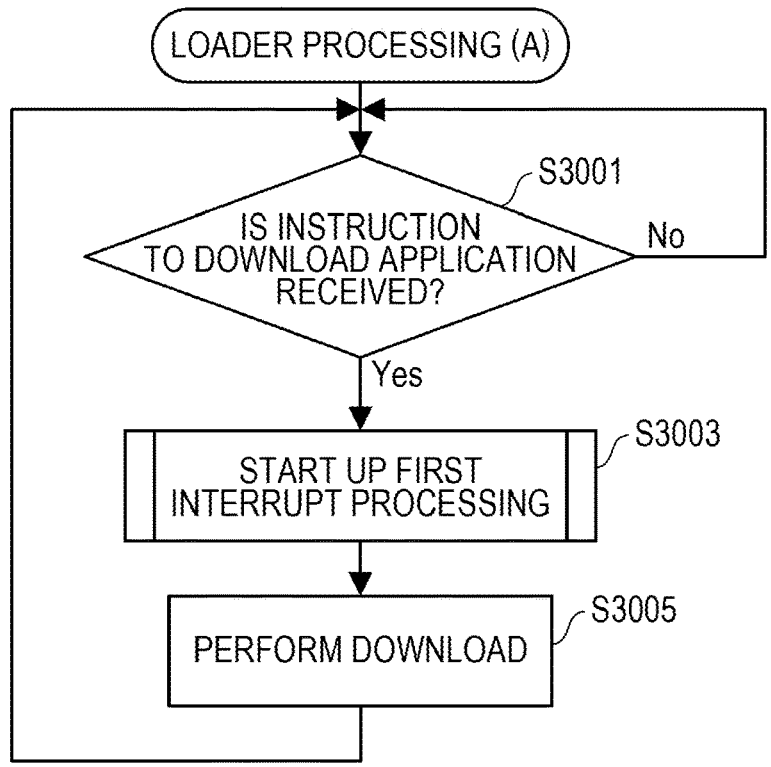
FIG. 30 is a diagram illustrating an example of a flowchart of processing (A) of a loader.

FIG. 30 illustrates processing (A) of the loader 2401. The loader 2401 determines whether or not an instruction to download the application 503 is received (S3001). In a case where it is determined that the instruction to download the application 503 is not received, the processing of S3001 is repeated. Meanwhile, in a case where it is determined that the instruction to download the application 503 is received, the loader 2401 starts up a first interrupt processing (S3003). The first interrupt processing will be described below with reference to FIG. 31.

If the first interrupt processing is started up, the loader 2401 performs downloading the application 503 (S3005). Then, the processing returns to the processing described in S3001 and the above-described processing is repeated.

Figure 31:
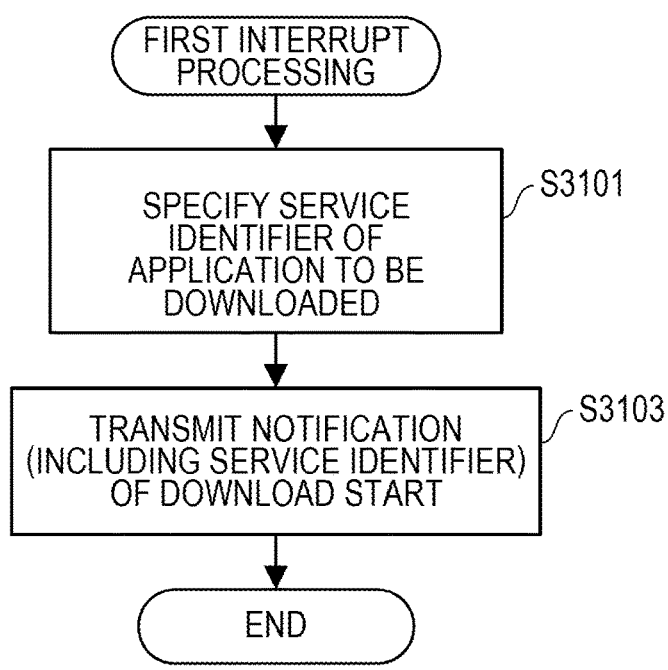
FIG. 31 is a diagram illustrating an example of a flowchart of first interrupt processing.

FIG. 31 illustrates a flowchart of the first interrupt processing. The specifying unit 1903 specifies the service identifier corresponding to the application 503 which is to be downloaded (S3101). The transmission unit 511 transmits a notification (including the service identifier) of the download start to the server system 101 (S3103). Then, the first interrupt processing ends.

Figure 32:
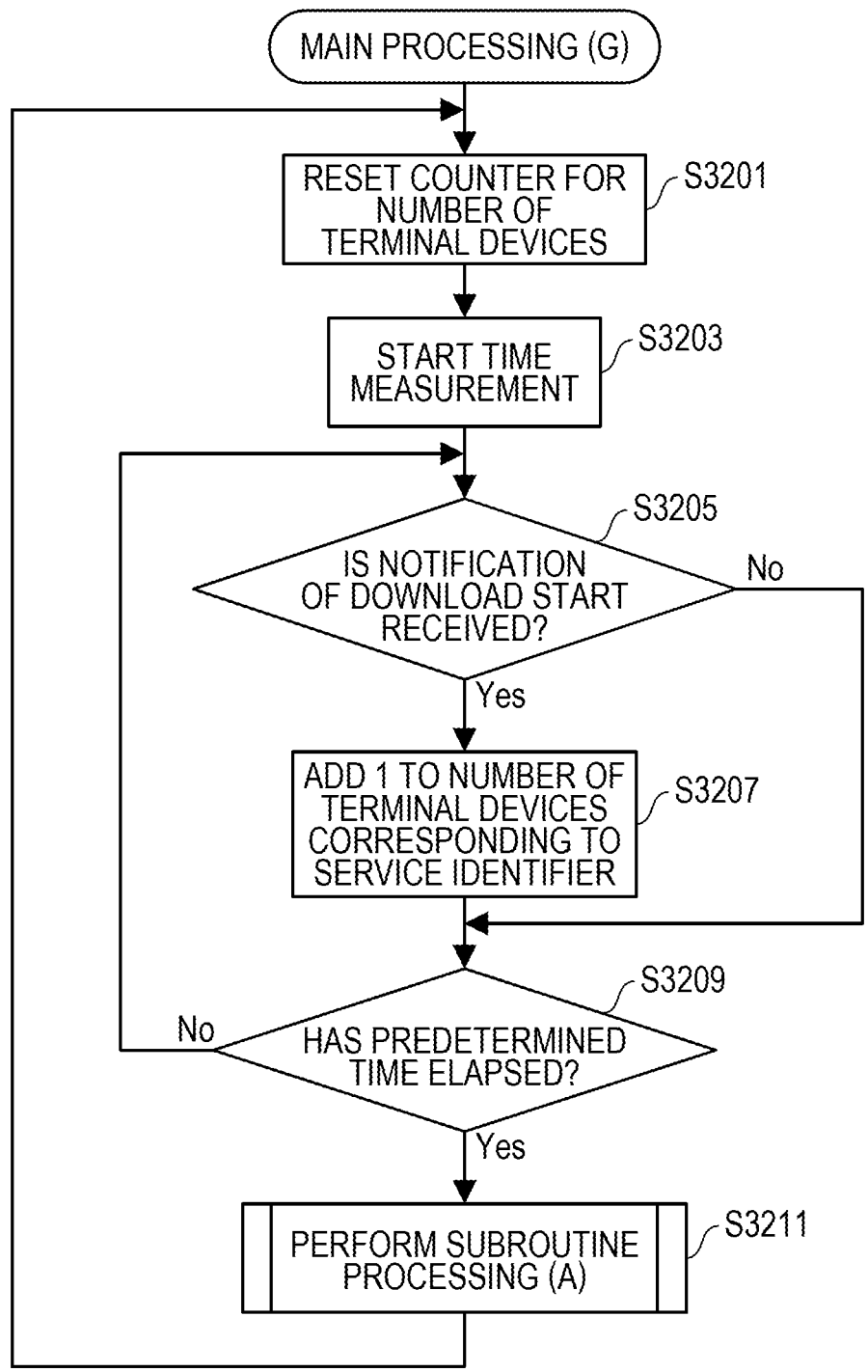
FIG. 32 is a diagram illustrating an example of a flowchart of main processing (G)

The server system 101 according to the embodiment performs main processing (G). A flowchart of the main processing (G) is illustrated in FIG. 32. The processing of S3201 and S3203 is the same as the processing of S1201 and S1203 illustrated in FIG. 12.

The calculation unit 915 determines whether or not the reception unit 913 receives the notification of the download start from the terminal device 105 (S3205). In a case where it is determined that the notification of the download start is not received, the processing proceeds to the processing of S3209.

Meanwhile, the notification of the download start is an example of a notification indicating a predetermined operation timing of the previous step using the service in the terminal device 105. That is, a download timing of the application 503 corresponds to the predetermined operation timing.

Meanwhile, in a case where it is determined that the notification of the download start is received, the calculation unit 915 adds 1 to the number of terminal devices corresponding to the service identifier included in the notification (S3207). That is, the calculation unit 915 adds 1 to the counter for the number of terminal devices of the service record specified by the service identifier.

The processing of S3209 and S3211 is the same as the processing of S1209 and S1211 illustrated in FIG. 12.

According to the embodiment, the scale-out may be started before an actual access frequency increases, in accordance with an increase of the terminal devices 105 in which downloading the application 503 starts.

In a certain example, the timing when the number of terminal device 105 in which downloading the application 503 starts does not coincide with the timing when the actual access frequency increases. The timings may be significantly shifted. Paying attention to the timing shift, the scale-out may be performed before the access frequency increases, by appropriately capturing an increase tendency of the terminal devices 105 in which downloading the application 503 starts.

Embodiment 8

In the embodiment, an example will be described in which it is determined whether to perform scale-out and whether or there is a demand for not scale-in, based on the number of terminal devices 105 in which downloading the application 503 is performed.

Figure 33:
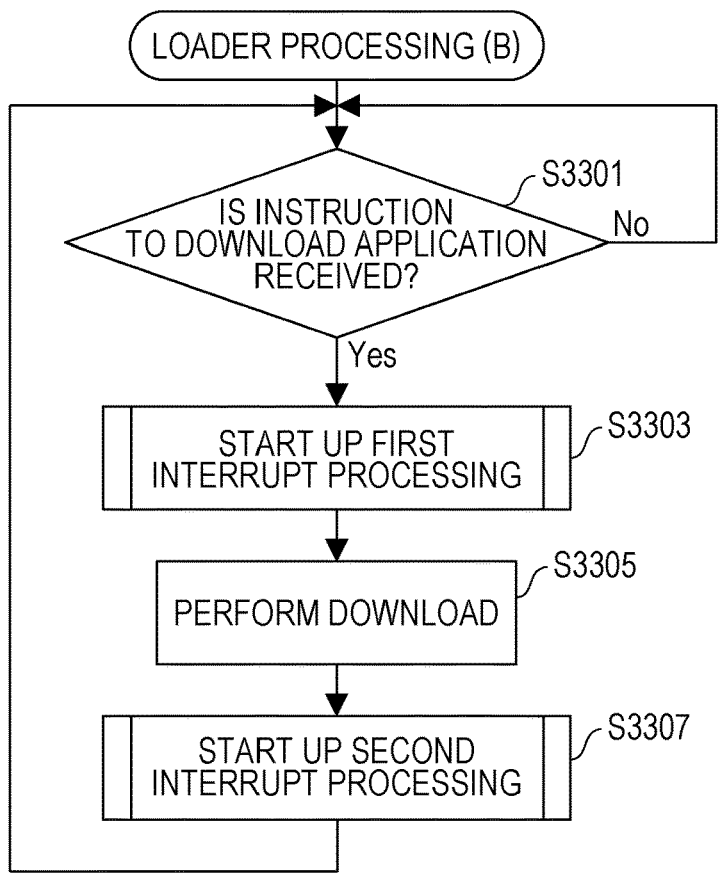
FIG. 33 is a diagram illustrating an example of a flowchart of processing (B) of the loader.

The loader 2401 according to the embodiment performs processing (B). A flowchart of the processing (B) of the loader 2401 is illustrated in FIG. 33. The processing of S3301 to S3305 is the same as the processing of S3001 to S3005 illustrated in FIG. 30.

If downloading the application 503 is completed, the loader 2401 starts up second interrupt processing (S3307). Then, the processing returns to the processing described in S3301, and the above-described processing is repeated.

Figure 34:
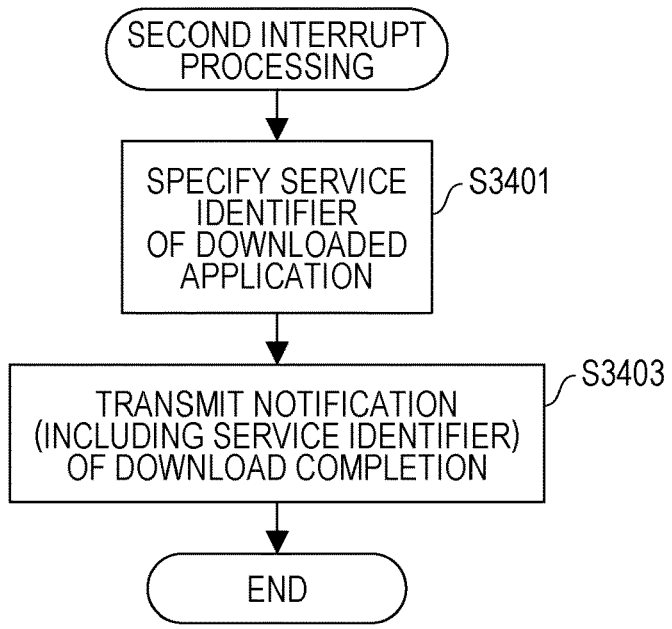
FIG. 34 is a diagram illustrating an example of a flowchart of second interrupt processing.

FIG. 34 illustrates a flowchart of the second interrupt processing. The specifying unit 1903 specifies the service identifier corresponding to the downloaded application 503 (S3401). The transmission unit 511 transmits a notification (including the service identifier) of download completion to the server system 101 (S3403).

Figure 35:
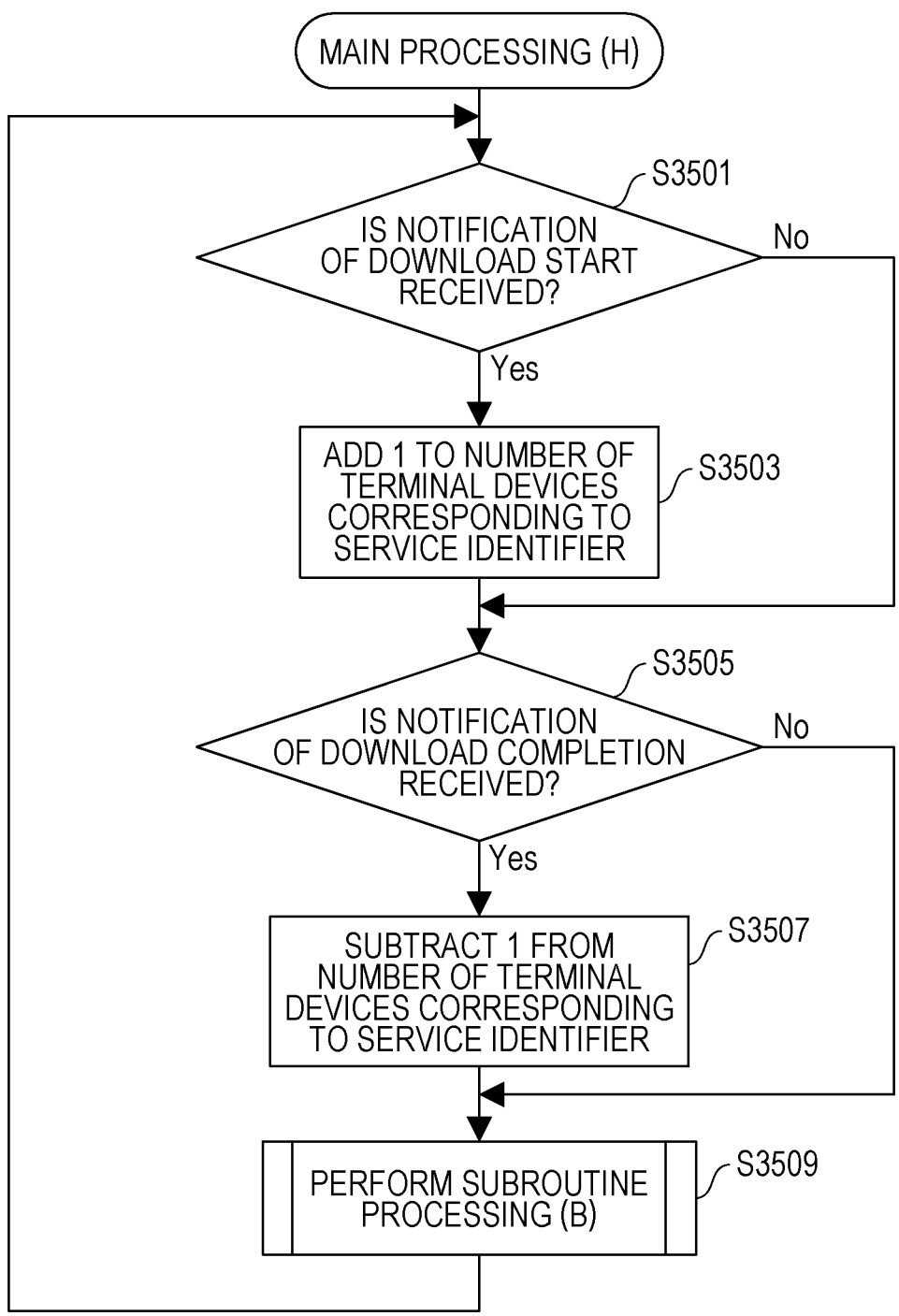
FIG. 35 is a diagram illustrating an example of a flowchart of main processing (H)

The server system 101 according to the embodiment performs main processing (H). A flowchart of the main processing (H) is illustrated in FIG. 35. The calculation unit 915 determines whether or not the reception unit 913 receives the notification of the download start from the terminal device 105 (S3501). In a case where it is determined that the notification of the download start is not received, the processing proceeds to the processing of S3505.

Meanwhile, the notification of the download start is an example of a notification indicating a predetermined operation timing of the previous step using the service in the terminal device 105. That is, a timing to start downloading the application 503 corresponds to the predetermined operation timing.

Meanwhile, in a case where it is determined that the notification of the download start is received, the calculation unit 915 adds 1 to the number of terminal devices corresponding to the service identifier included in the notification (S3503). That is, the calculation unit 915 adds 1 to the counter for the number of terminal devices of the service record specified by the service identifier.

The calculation unit 915 determines whether or not the reception unit 913 receives the notification of download completion from the terminal device 105 (S3505). In a case where it is determined that the notification of the download completion is not received, the processing proceeds to the processing of S3509.

Meanwhile, in a case where it is determined that the notification of the download completion is received, the calculation unit 915 subtracts 1 from the number of terminal devices corresponding to the service identifier included in the notification (S3507). That is, the calculation unit 915 subtracts 1 from the counter for the number of terminal devices of the service record specified by the service identifier.

The processing of S3509 is the same as the processing of S1609 illustrated in FIG. 16.

According to the embodiment, the scale-out may be started before an actual access frequency increases, in accordance with an increase of the terminal devices 105 in which downloading the application 503 is performed. In addition, the scale-in may be started in accordance with reduction of the terminal devices 105 in which downloading the application 503 is performed.

In a certain example, the timing when the number of terminal devices 105 in which downloading the application 503 is performed increases does not coincide with the timing when the actual access frequency increases. The timings may be significantly shifted. Paying attention to the timing shift, the scale-out may be performed before the access frequency increases, by appropriately capturing an increase tendency of the terminal devices 105 in which downloading the application 503 is performed. In the same manner, the scale-in may be performed before the access frequency is reduced, by appropriately capturing reduction tendency of the terminal devices 105 in which downloading the application 503 is performed.

Embodiment 9

In Embodiment 1, subroutine processing (B) may be performed instead of the subroutine processing (A).

According to the embodiment, the scale-in may be started in accordance with reduction of the terminal device 105 in which a program starts up.

Embodiment 10

In Embodiment 3, the subroutine processing (B) may be performed instead of the subroutine processing (A).

According to the embodiment, the scale-in may be started in accordance with reduction of the started-up terminal device 105.

Embodiment 11

In Embodiment 5, the subroutine processing (B) may be performed instead of the subroutine processing (A).

According to the embodiment, the scale-in may be started in accordance with reduction of the terminal device 105 in which the loader 2401 starts up.

Embodiment 12

In Embodiment 7, the subroutine processing (B) may be performed instead of the subroutine processing (A).

According to the embodiment, the scale-in may be started in accordance with reduction of the terminal device 105 in which downloading the application 503 starts.

Embodiment 13

In Embodiment 2, the subroutine processing (A) may be performed instead of the subroutine processing (B). In addition, in Embodiment 4, the subroutine processing (A) may be performed instead of the subroutine processing (B). In addition, in Embodiment 6, the subroutine processing (A) may be performed instead of the subroutine processing (B). In addition, in Embodiment 8, the subroutine processing (A) may be performed instead of the subroutine processing (B).

In the embodiment, scale-in may be performed by a determination of processing other than the subroutine processing (B).

Embodiment 14

An example is described in which scale-out is performed to improve processing capability of a service in the subroutine processing (A), but scale-up may be performed.

FIG. 36 illustrates an example of the service table according to Embodiment 14. A service record includes a field in which service identifiers are stored, a counter for the number of terminal devices, a counter for the number of most recent accesses, a field in which a lower limit value corresponding to a resource amount level is stored, and a field in which an upper limit value corresponding to the resource amount level is stored.

In a case where the amount of resources of a related level is allocated to an instance, a lower limit value corresponding to the resource amount level indicates a lower limit of an appropriate range of the number of accesses received within a predetermined time. In a case where the amount of resources of a related level is allocated to an instance, an upper limit value corresponding to the resource amount level indicates an upper limit of the appropriate range of the number of accesses received within the predetermined time. The amount of resources is, for example, time and/or the amount of memory allocated on a computing device.

Figure 37:
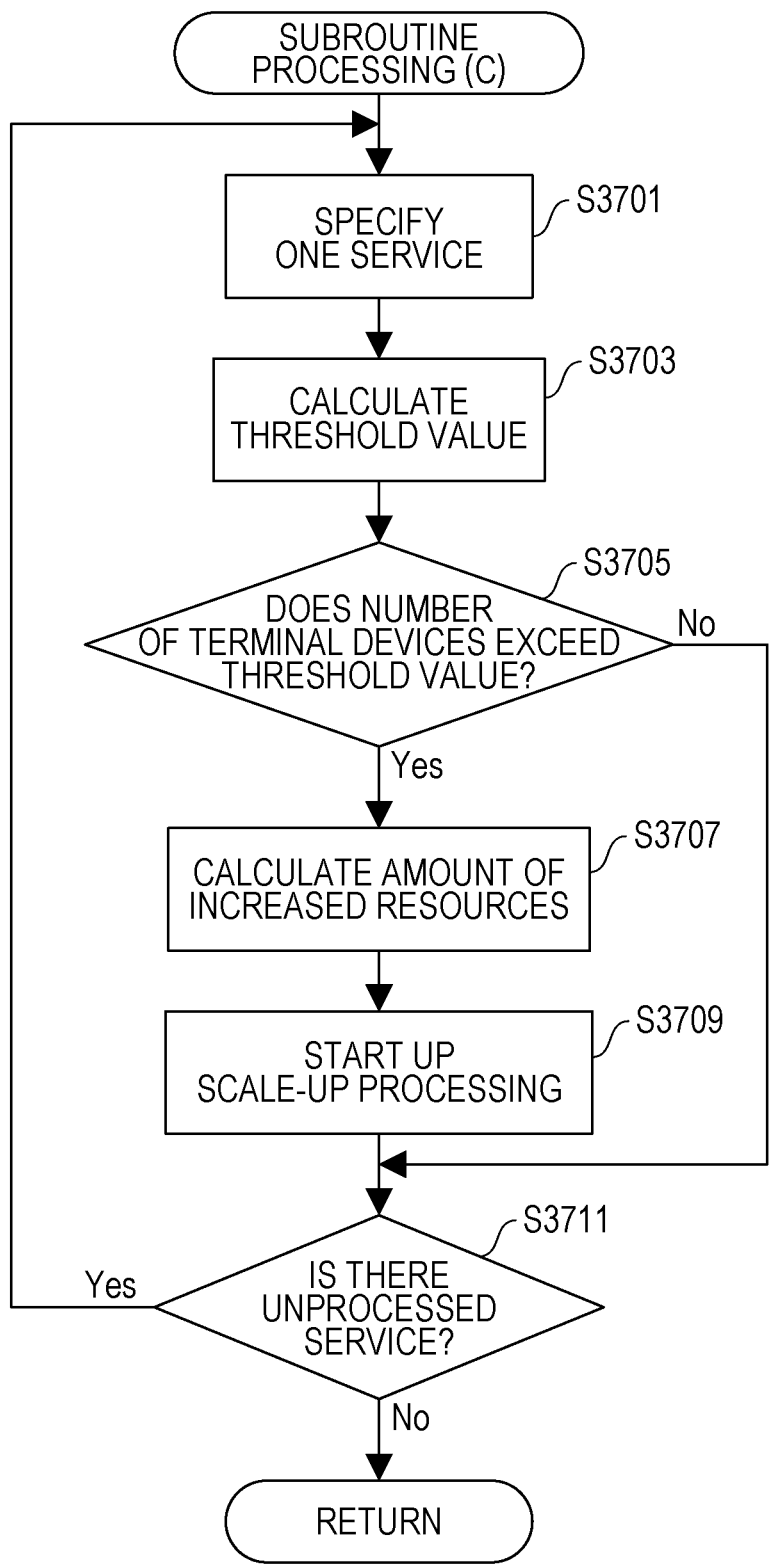
FIG. 37 is a diagram illustrating an example of a flowchart of subroutine processing (C)

FIG. 37 illustrates a flowchart of subroutine processing (C). The determination unit 919 specifies one service (S3701). Specifically, the determination unit 919 specifies one service record.

The determination unit 919 calculates a threshold value (S3703). For example, the determination unit 919 calculates the threshold value by multiplying a value obtained by subtracting the number of most recent accesses from the upper limit value of the number of accesses in the current resource amount level by a predetermined coefficient. The predetermined coefficient is, for example, a value smaller than 1. However, the predetermined coefficient may be 1. Alternatively, the predetermined coefficient may be larger than 1.

The determination unit 919 determines whether or not the counter for the number of terminal devices of the service record exceeds the threshold value (S3705). In a case where it is determined that the number of terminal devices does not exceed the threshold value, the processing proceeds to S3711.

Meanwhile, in a case where it is determined that the number of terminal devices exceeds the threshold value, scale-up processing is performed. Accordingly, the determination unit 919 calculates the amount of increased resources (S3707). For example, the determination unit 919 specifies the resource amount level in which the number of terminal devices corresponds to the range of the number of accesses, and calculates the amount of increase by subtracting the amount of current resources from the amount of resources of the resource amount level.

The scaling unit 921 starts up the scale-up processing according to the amount of increase (S3709). That is, the scaling unit 921 increases the amount of resources allocated to the instance of the service.

The determination unit 919 determines whether or not there is an unprocessed service (S3711). In a case where it is determined that there is an unprocessed service, the processing returns to the processing described in S3701, and the above-described processing is repeated.

Meanwhile, in a case where it is determined that there is no unprocessed service, the subroutine processing (C) ends and returns to the main processing of a calling source.

In Embodiment 1, 3, 5, 7, and 13, the subroutine processing (C) may be performed instead of the subroutine processing (A).

According to the embodiment, the system may cope with an increase of access by the scale-up.

Embodiment 15

An example is described in which scale-out and scale-in are performed in the subroutine processing (B), but scale-up and scale-down may be performed.

Figure 38:
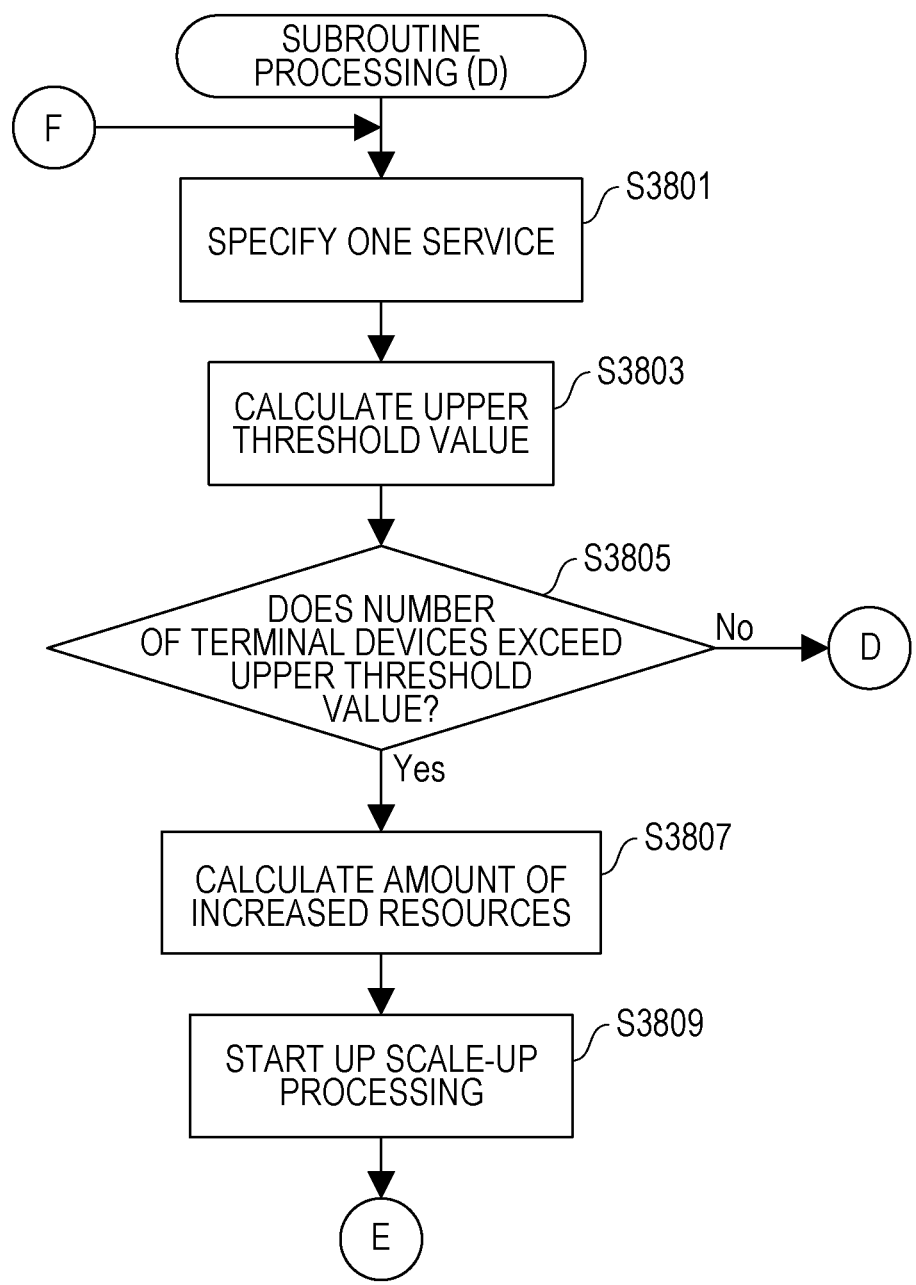
FIG. 38 is a diagram illustrating an example of a flowchart of subroutine processing (D)

FIG. 38 illustrates a flowchart of subroutine processing (D). The determination unit 919 specifies one service (S3801). Specifically, the determination unit 919 specifies one service record.

The determination unit 919 calculates an upper threshold value (S3803). For example, the determination unit 919 calculates the upper threshold value by subtracting a predetermined value from the upper limit value of the number of accesses in the current resource amount level. The predetermined value is, for example, a positive value. However, the predetermined value may be zero. Alternatively, the predetermined value may be a negative value.

In another example, the determination unit 919 may calculate the upper threshold value by multiplying the upper limit value of the number of accesses in the current resource amount level by a predetermined coefficient. The predetermined coefficient is, for example, a value smaller than 1. However, the predetermined coefficient may be 1. Alternatively, the predetermined coefficient may be larger than 1.

The determination unit 919 determines whether or not the counter for the number of terminal devices of the service record exceeds the upper threshold value (S3805). In a case where it is determined that the number of terminal devices exceeds the upper threshold value, the determination unit 919 calculates the amount of increased resources (S3807). The processing of S3807 and S3809 is the same as the processing of S3707 and S3709 illustrated in FIG. 37. Then, the processing proceeds to processing of S3909 illustrated in FIG. 39 via a terminal E.

Figure 39:
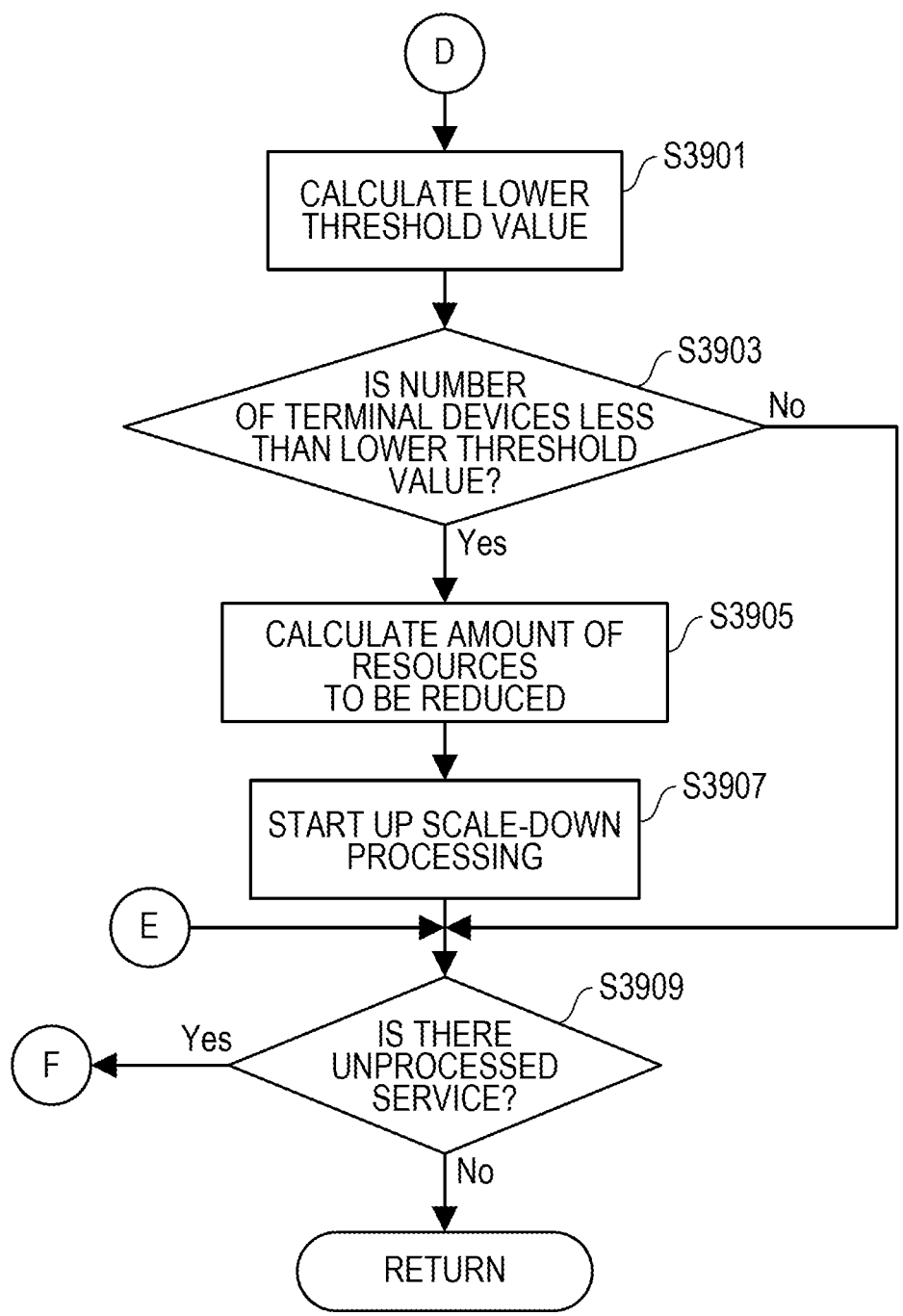
FIG. 39 is a diagram illustrating an example of a flowchart of the subroutine processing (D)

Meanwhile, in a case where it is determined that the counter for the number of terminal devices of the service record does not exceed the upper threshold value in S3805, the processing proceeds to processing of S3901 illustrated in FIG. 39 via a terminal D.

Description proceeds to FIG. 39. The determination unit 919 calculates a lower threshold value (S3901). For example, the determination unit 919 calculates the lower threshold value by adding a predetermined value to the lower limit value of the number of accesses in the current resource amount level. The predetermined value is, for example, a positive value. However, the predetermined value may be zero. Alternatively, the predetermined value may be a negative value.

In another example, the determination unit 919 may calculate the lower threshold value by multiplying the lower limit value of the number of accesses in the current resource amount level by a predetermined coefficient. The predetermined coefficient is, for example, a value larger than 1. However, the predetermined coefficient may be 1. Alternatively, the predetermined coefficient may be smaller than 1.

The determination unit 919 determines whether or not the counter for the number of terminal device of the service record is less than the lower threshold value (S3903). In a case where it is determined that the counter for the number of terminal devices is not less than the lower threshold value, the processing proceeds to the processing described in S3909.

Meanwhile, in a case where it is determined that the counter for the number of terminal devices is less than the lower threshold value, the determination unit 919 calculates the amount of resources to be reduced (S3905). For example, the determination unit 919 specifies the resource amount level in which the number of terminal devices corresponds to the range of the number of accesses, and calculates the amount of reduction by subtracting the amount of resources of the specified resource amount level from the amount of current resources.

The Scaling unit 921 starts up a scale-down processing according to the amount of reduction (S3907). That is, the scaling unit 921 reduces the amount of resources allocated to the instance of the service.

The determination unit 919 determines whether or not there is an unprocessed service (S3909). In a case where it is determined that there is an unprocessed service, the processing returns to the processing of S3801 illustrated in FIG. 38 via a terminal F.

Meanwhile, in a case where it is determined that there is no unprocessed service, the subroutine processing (D) ends and returns to the main processing of a calling source.

In Embodiment 2, 4, 5, and 8 to 12, the subroutine processing (D) may be performed instead of the subroutine processing (B).

According to the embodiment, the system may cope with an increase of access by the scale-up. In addition, the system may cope with reduction of access by the scale-down.

Meanwhile, in a case where a plurality of execution environments are provided in the service platform 901, the above-described embodiments may be applied in each execution environment. For example, in a case where the execution environment is provided for each tenant, the terminal devices 105 used by each tenant may be distinguished, and the number of terminal devices may be aggregated for each tenant.

In addition, in a case where the delivery unit 2603 manages the number of delivered applications 503, whether to perform the scaling may be determined in accordance with an increase or reduction of the number of delivery.

As such, embodiments according to the present disclosure are described, and the present disclosure is not limited to these. For example, the above-described functional block configuration may not coincide with the program module configuration.

In addition, configurations of each storage region described above are examples, and do not have to be configured as described above. Furthermore, also in the processing flow, unless the processing results are changed, a sequence of processing may be changed or a plurality of processing may be performed in parallel.

FIG. 40 illustrates an example of the hardware configuration of the terminal device 105 including a wireless communication device. The terminal device 105 includes a processor 4001, a storage unit 4003, an antenna 4011, a wireless control unit 4013, an audio control unit 4015, a speaker 4017, a microphone 4019, a display 4021, a touch sensor 4023, a camera 4025, and a global positioning system (GPS) device 4027.

The processor 4001 may be configured by a modem central processing unit (CPU) and an application CPU. The storage unit 4003 includes a read only memory (ROM) 4005, a random access memory (RAM) 4007, and a flash memory 4009. The ROM 4005 stores, for example, pre-set data and a preset program. The RAM 4007 includes a region for developing a program or data such as the application 503. The flash memory 4009 stores, for example, the OS 501 and a program such as the application 503, and further stores the data at any time.

The touch sensor 4023 is, for example, a panel type sensor disposed on a display surface of the display 4021, and receives a touch operation. The display 4021 displays, for example, various screens displayed by the application 503. Specifically, a touch panel in which the display 4021 and the touch sensor 4023 are integrated is used. A touch event is generated by a touch operation to the touch sensor 4023. Keys may be provided in addition to the touch sensor 4023.

The antenna 4011 receives wireless data of, for example, a cellar method. The wireless control unit 4013 controls the wireless communication. Voice communication of telephone and data communication are performed by the control of wireless communication.

The audio control unit 4015 performs an analog-to-digital conversion and a digital-to-analog conversion of sound data. The speaker 4017 outputs the analog data as sound. The microphone 4019 converts the sound into analog data.

The camera 4025 is used for capturing a moving image and a photographic image. The GPS device 4027 measures a position.

The server device 103 and the terminal device 105 including a wire communication device are a computer device, and as described in FIG. 41, a memory 2501, a CPU 2503, a hard disk drive (HDD) 2505, a display control unit 2507 coupled to the display device 2509, a drive device 2513 for a removable disk 2511, an input device 2515, and a communication control unit 2517 for being coupled to a network are coupled to each other by a bus 2519. An operating system (OS) and an application program for performing the processing according to the embodiment are stored in the HDD 2505, and are read from the HDD 2505 to the memory 2501 when being executed by the CPU 2503. The CPU 2503 controls the display control unit 2507, the communication control unit 2517, and the drive device 2513 in accordance with processing content of the application program to perform a predetermined operation. In addition, data in the middle of processing is stored mainly in the memory 2501, but may be stored in the HDD 2505. In the embodiment according to the present disclosure, the application program for performing the above-described processing is stored in a computer-readable removable disk 2511 and distributed, and is installed from the drive device 2513 to the HDD 2505. The application program may be installed in the HDD 2505 via a network such as the Internet and the communication control unit 2517. Such a computer device realizes various functions described above by organically cooperating hardware such as the CPU 2503 and the memory 2501 and programs such as the OS and the application program.

Summarization of the embodiments according to the present disclosure described above is as follows.

An information processing apparatus according to the embodiment includes: (A) a reception unit that receives a notification indicating a predetermined operation timing of the previous step using a service in the terminal device, from a terminal device; and (B) a scaler that performs scaling of the service, based on the notification.

By doing so, it is possible to more appropriately cope with a variation of a load with respect to the service.

Furthermore, the predetermined operation timing may be a start-up timing of a program for accessing the service.

By doing so, it is possible to start scaling before an actual access frequency is changed, when there is an indication of start-up of the program in the terminal device.

Furthermore, the scaler may include (C) a calculation unit that calculates the number of terminal devices in which the program starts up, based on the notification, and (D) a determination unit that determines whether to perform scaling, based on the number of the terminal devices.

By doing so, it is possible to start the scaling before the actual access frequency is changed, in accordance with an increase or reduction of the terminal devices in which the program starts up.

Furthermore, the reception unit may receive a notification indicating a program stop timing. In addition, the scaler may include (E) a calculation unit that calculates the number of terminal devices in which a program operates, based on the notification, and (F) a determination unit that determines whether to perform the scaling, based on the number of the terminal devices.

By doing so, it is possible to start scaling before a tendency of an actual access frequency is changed, in accordance with an increase or reduction of the terminal devices in which a program operates.

Furthermore, the predetermined operation timing may be a start-up timing of the terminal device.

By doing so, it is possible to start scaling before an actual access frequency is changed, when there is an indication of start-up of the terminal device.

Furthermore, the above-described scaler may include: (G) a calculation unit that calculates the number of started-up terminal devices, based on the notification, and (H) a determination unit that determines whether to perform scaling, based on the number of terminal devices.

By doing so, it is possible to start the scaling before an actual access frequency is changed, in accordance with an increase or reduction of the started-up terminal device.

Furthermore, the reception unit may receive a notification indicating a terminal device stop timing. In addition, the scaler may include (I) a calculation unit that calculates the number of terminal devices in operation, based on the notification, and (J) a determination unit that determines whether to perform the scaling, based on the number of the terminal devices.

By doing so, it is possible to start scaling before a tendency of an actual access frequency is changed, in accordance with an increase or reduction of the terminal device in operation.

Furthermore, the predetermined operation timing may be a start-up timing of a loader which is used for downloading a program for accessing a service.

By doing so, it is possible to start the scaling before an actual access frequency is changed, when there is an indication of start-up of the loader.

Furthermore, the above-described scaler may include: (K) a calculation unit that calculates the number of terminal devices in which loaders start up, based on the notification, and (L) a determination unit that determines whether to perform scaling, based on the number of terminal devices.

By doing so, it is possible to start the scaling before an actual access frequency is changed, in accordance with an increase or reduction of the terminal device in which the loader starts up.

Furthermore, the reception unit may receive a notification indicating a loader stop timing. In addition, the scaler may include (M) a calculation unit that calculates the number of terminal devices in which the loaders operate, based on the notification, and (N) a determination unit that determines whether to perform the scaling, based on the number of the terminal devices.

By doing so, it is possible to start the scaling before a tendency of an actual access frequency is changed, in accordance with an increase or reduction of the terminal device in which the loader operates.

Furthermore, the predetermined operation timing may be a timing to start downloading a program for accessing a service.

By doing so, it is possible to start the scaling before an actual access frequency is changed, when there is an indication of start of downloading a program.

Furthermore, the scaler may include: (O) a calculation unit that calculates the number of terminal devices in which downloading is started, based on the notification, and (P) a determination unit that determines whether to perform the scaling, based on the number of terminal devices.

By doing so, it is possible to start scaling before an actual access frequency is changed, in accordance with an increase or reduction of the terminal device in which downloading a program starts.

Furthermore, the reception unit may receive a notification indicating a downloading completion timing. In addition, the scaler may include (Q) a calculation unit that calculates the number of terminal devices in which downloading is performed, based on the notification, and (R) a determination unit that determines whether to perform the scaling, based on the number of the terminal devices.

By doing so, it is possible to start the scaling before a tendency of an actual access frequency is changed, in accordance with an increase or reduction of the terminal device in which downloading a program is performed.

It is possible to generate a program for causing a computer to perform processing of the above-described information processing apparatus, and the program may be stored in a computer-readable storage medium or a storage device such as a flexible disk, a CD-ROM, a magneto-optical disk, a semiconductor memory, or a hard disk. Meanwhile, intermediate processing results are temporarily stored in a storage device such as a main memory in general.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for providing a service to a plurality of terminal devices, the apparatus comprising:
    a memory; and
    a processor coupled to the memory, the processor configured to:
        receive, from each of one or more terminal devices among the plurality of terminal devices, a first notification indicating a predetermined operation timing before the service is used in the each of the one or more terminal devices, and
        perform scaling of the service, based on the first notifications received from the one or more terminal devices.

2. The apparatus of claim 1, wherein
    the predetermined operation timing is a timing at which a program for accessing the service has been started up in each terminal device.

3. The apparatus of claim 2, wherein the processor is further configured to:
    calculate, based on the first notifications, a first number indicating a number of terminal devices in which the program has been started up, and
    determine, based on the calculated first number, whether to perform the scaling of the service.

4. The apparatus of claim 2, wherein the processor:
    receives a second notification indicating a timing at which the program has been stopped in each terminal device, calculates, based on the first notifications and the second notifications, a second number indicating a number of terminal devices in which the program is in operation, and determines, based on the calculated second number, whether to perform the scaling of the service.

5. The apparatus of claim 1, wherein
the predetermined operation timing is a timing at which each terminal device has been started up.

6. The apparatus of claim 5, wherein the processor:
calculates, based on the first notifications, a first number indicating a number of terminal devices that have been started up, and
determines, based on the first number, whether to perform the scaling of the service.

7. The apparatus of claim 5, wherein the processor:
receives a second notification indicating a timing at which each terminal device has been stopped,
calculates, based on the first notification and the second notifications, a second number indicating a number of terminal devices that are in operation, and
determines, based on the calculated second number, whether to perform the scaling of the service.

8. The apparatus of claim 1, wherein
the predetermined operation timing is a timing at which a loader that is used for downloading a program for accessing the service has been started up in each terminal device.

9. The apparatus of claim 8, wherein the processor:
calculates, based on the first notification, a first number indicating a number of terminal devices in which the loader has been started up, and
determines, based on the calculated first number, whether to perform the scaling of the service.

10. The apparatus of claim 8, wherein the processor:
receives a second notification indicating a timing at which the loader has been stopped in each terminal device,
calculates, based on the first notifications and the second notifications, a second number indicating a number of terminal devices in which the loader is in operation, and
determines, based on the second number, whether to perform the scaling of the service.

11. The apparatus of claim 1, wherein
the predetermined operation timing is a timing at which download of a program for accessing the service has been started in each terminal device.

12. The apparatus of claim 11, wherein the processor:
calculates, based on the first notification, a first number indicating a number of terminal devices in which the download has been started, and
determines, based on the calculated first number, whether to perform the scaling of the service.

13. The apparatus of claim 11, wherein the processor:
receives a second notification indicating a timing at which the download has been completed in each terminal device,
calculates, based on the first notifications and the second notifications, a second number indicating a number of terminal devices in which the download is ongoing, and
determines, based on the calculated second number, whether to perform the scaling of the service.

14. A non-transitory, computer-readable recording medium having stored therein a program for causing a computer to execute a process, the computer included in an apparatus for providing a service to a plurality of terminal devices, the process comprising:
receiving, from each of one or more terminal devices among the plurality of terminal devices, a first notification indicating a predetermined operation timing before the service is used in the each of the one or more terminal devices, and
performing scaling of the service, based on the first notifications received from the one or more terminal devices.

15. A method for providing a service to a plurality of terminal devices, the method comprising:
receiving, from each of one or more terminal devices among the plurality of terminal devices, a first notification indicating a predetermined operation timing before the service is used in the each of the one or more terminal devices, and
performing scaling of the service, based on the first notifications received from the one or more terminal devices.

* * * * *